INVENTOR:
DOMINIQUE BROUARD
BY Kurt Kelman
Agent

INVENTOR:
DOMINIQUE BROUARD
BY Kurt Kelman
Agent

INVENTOR:
DOMINIQUE BROUARD
BY Kurt Kelman
Agent

Aug. 16, 1966 D. BROUARD 3,267,208

COLOR IDENTIFICATION AND ASSOCIATED APPARATUS IN SEQUENTIAL COLOR TELEVISION SYSTEMS

Filed April 3, 1963 8 Sheets-Sheet 4

INVENTOR:
DOMINIQUE BROUARD
BY Kurt Kelman
Agent

INVENTOR:
DOMINIQUE BROUARD
BY Kurt Kelman
Agent

INVENTOR:
DOMINIQUE BROUARD
BY Kurt Kelman
Agent

INVENTOR:
DOMINIQUE BROUARD
BY Kurt Kelman
Agent

INVENTOR:
DOMINIQUE BROUARD
BY Kurt Kelman
Agent 3,267,208
Patented August 16, 1966

3,267,208

COLOR IDENTIFICATION AND ASSOCIATED APPARATUS IN SEQUENTIAL COLOR TELEVISION SYSTEMS

Dominique Brouard, Levallois-Perret, France, assignor to Compagnie Francaise de Television, a corporation of France Filed Apr. 3, 1963, Ser. No. 270,464
Claims priority, application France, Apr. 5, 1962, 893,396, Patent 1,344,234; June 6, 1962, 899,861, Patent 82,659; Jan. 7, 1963, 920,625, Patent 83,517; Mar. 14, 1963, 927,943, Patent 83,767
32 Claims. (Cl. 178—5.2)

The present invention has for its object to provide an improvement to colour television systems of the type in which two colour signals which alternate at the line frequency are transmitted over a common channel.

It has also for its object to provide transmitters and receivers embodying this improvement.

In colour television systems of the aforesaid type, at the receiving end, the two sequentially transmitted signals, or two sequential signals derived therefrom, are to be switched to two different channels. This is effected by means of a switch, to the input of which the sequential signals are applied and which connects its input to one or the other of the two channels according to whether it is in one or the other of two different states, the switch passing from one state to the other during the horizontal blanking time intervals, under the action of a control circuit.

The state of this switch, during any line period, has to be controlled in accordance with the sequential signal being transmitted, and to this end the switch control circuit has to receive in due course a signal carrying an information as to the nature of this signal.

A known method consists in transmitting, during the horizontal blanking intervals, identification signals preceding at least one of the two sequential colour signals.

Identification signals of this type present two major drawbacks:

(a) They are necessarily very short signals and it is difficult to make them such that no undesired signal, for example a noise signal, should from time to time operate the switch control circuit in lieu of the identification signals and bring the switch into the wrong state.

(b) They occupy a portion of the horizontal blanking intervals which it is often desired to use for other purposes, for example for the transmission of a reference signal, such as a level or frequency reference signal.

The present invention obviates these drawbacks.

It will be first briefly recalled that, in the transmitter, the two signals to be sequentially transmitted are respectively applied to the two inputs of a switch, which directs them towards its single output, in alternate order, thus providing sequential signals at this output.

For a correct operation of the switching system at the receiving end, it is of course necessary that, for any line interval, the state of the receiver switch should be in accordance with that of the transmitter switch. If this condition is enforced the two switches may be said to be in phase, or it may be said that the phase of the receiver switch is correct. In the opposite case, it may be said that the two switches are in phase opposition, or that the phase of the receiver switch is wrong.

According to the invention, a colour television system, of the type in which two colour signals are, before they are transmitted over a common channel, converted into sequential signals, which alternate at the line frequency during the visible portion of each field, by means of a switch having two input channels and one output channel, while at the receiving end, the two transmitted sequential signals, or two sequential signals derived therefrom, are directed to two different channels by means of a receiver switch comprising at least one input to which the above signals are applied, and two outputs respectively connected to two different channels, comprises:

In the transmitter: means for, directly or indirectly, injecting a channel identifying signal into at least one of said input channels of said transmitter switch during checking periods occurring during at least some of the vertical blanking intervals; and means for causing the transmitter switch to change regularly, at the line frequency, from one state to the other, at least between the beginning of each checking period and the beginning of the vertical blanking interval comprising the following checking period;

And, in the receiver: a switch control circuit connected, at least during said checking periods, to a receiver channel, referred to as a checked channel, wherein, during said checking periods propagates a signal, referred to as a test signal, which signal depends upon the phase of the receiver switch relatively to the phase of the transmitter switch, said switch control circuit being designed to cause said receiver switch to change, at the line frequency, from one state to the other outside of the checking periods, and during each checking period, to maintain or alter the regular alternation, at the line frequency, of the receiver switch states in accordance with the test signal supplied to said circuit by said checked channel, so that the transmitter and receiver switches should be in phase at the end of each checking period.

The invention will be best understood from the following description and appended drawings wherein.

The invention will be described as applied to a sequential-simultaneous colour television system with memory.

In this system, the signal modulating the carrier wave comprises a luminance signal Y and a subcarrier wave, which is itself alternately modulated for the duration of one line, respectively by two colour signals, which will generally be designated as $A_1$ and $A_2$. The latter signals are repeated at the receiver during those line periods during which they were not transmitted, so that signals $A_1$ and $A_2$ become simultaneous signals.

It will be assumed, by way of example, that the carrier wave is amplitude modulated while the subcarrier wave is frequency modulated.

In an embodiment of this system, the luminance signal is of the form:

$$Y=0.59G+0.30R+0.11B$$

where G, R and B are respectively the green, red and blue primary colour signals, delivered by the camera apparatus, which signals have been gamma corrected.

Signals $A_1$ and $A_2$ are respectively proportional to $R-Y$ and $B-Y$, their frequency band being however made narrower than that of the luminance signal Y.

More precisely, $$A_1=k_1(R-Y)$$

and $$A_2=k_2(B-Y)$$

where $k_1$ and $k_2$ are two constants, whose absolute values are so selected that $A_1$ and $A_2$ should have the same interval of variation, for example $-1$ to $+1$, $k_1$ being negative and $k_2$ positive.

As applied to this system, the channel identifying signals, or identification signals, according to the invention are of course preferably modulated on the subcarrier wave.

Figure 1:
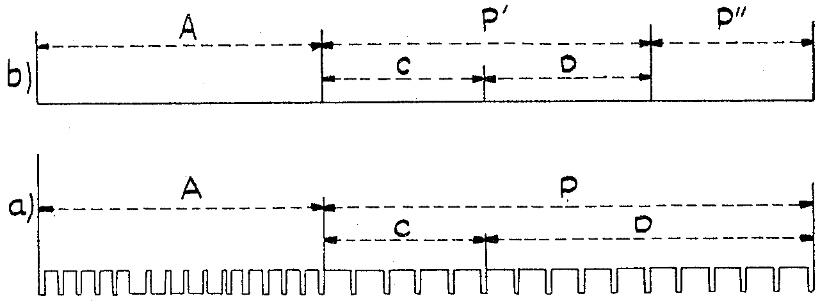
FIGS. 1 and 2 are graphs illustrating the principle of the invention.

FIG. 1 shows a signal directly modulated on the carrier wave as transmitted in television systems during the vertical blanking intervals. Whatever the standards used, this signal comprises, a first portion A, corresponding to the "complete" field synchronizing signal, i.e. the signal comprising, in addition to the field synchronizing pulses in the strict sense of the term, the equalizing pulses which respectively precede and follow the former signal.

This signal portion A, which, as shown in the figure conforms to the CCIR standard, is followed by a time interval P of, for example fifteen line periods, during which a signal is transmitted, which has a constant level, i.e. the black level, except for short pulses at the line frequency which are transmitted so as to avoid any interruption of the pulses at this frequency as received by the receivers.

According to the invention, the checking periods are included in vertical blanking intervals and, preferably, occupy only a portion of intervals P. Actually, it is preferred that checking periods should not extend into portions A in order to avoid any risk of their perturbing the synchronizing signals. Also it is preferred that checking periods should not begin immediately after the field synchronizing signal so as to ensure that they should not perturb the black level signal during the upwards retrace of the spot on the receiver screens.

In FIG. 1*a*, the checking period D begins after an interval C comprising five line periods. Thus the checking period extends over ten line periods i.e. over the time interval $D=P-C$.

Of course, provided the checking period lasts sufficiently long to ensure a proper operation of the switch control circuit at the receiving end, it need not extend until the end of the vertical blanking time interval. If, for example, it is desired to use the last portion of this time interval for the transmission of standard maintenance signals directly modulated on the carrier wave, it may be preferable to eliminate the subcarrier during that time. This results in a vertical blanking interval, as shown in FIG. 1*b*.

As concerns the transmission of signals directly modulated on the carrier wave, the time interval P', following interval A, corresponds to that occupied by the black level signal and the pulses at the line frequency, while the last portion P'' is used for transmitting standard signals separated by the same line frequency pulses.

As concerns the subcarrier wave, the checking period corresponds then advantageously to the second half (five lines) of interval P', the first half of this interval corresponding to the time interval C which it is preferred to arrange between portion A and the checking period.

Of course, all the above numerical data are given only by way of example.

It is also preferred that the identification signals should occupy, within the checking periods, only discrete intervals corresponding to the active portion of the line periods, i.e. to discrete time intervals separated by horizontal blanking intervals.

Figure 2:
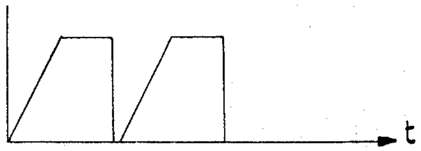

A channel identifying signal will thus advantageously be, within each checking period, a periodic signal at the line frequency. As to its form, while signals having other forms may be used, a preferred one is a rectangular trapezium as shown in FIG. 2 (where only two trapezia have been shown, although their number is equal to the number of line periods contained in the checking period). The reason is that such a signal combines a sawtooth portion, providing a useful signal for the adjustment of the receiver circuits by manufacturers or repairers, and a high level rectangular portion which is suitable for obtaining high level integrated signals for the receiver switch control circuit.

For the same reason, the maximum level of the identification signal will be made equal to the maximum level which can be modulated on the subcarrier wave in the system considered.

The system according to the invention will operate all the better if two different identification signals, in particular two signals differing only by their sign, are respectively injected into the two input channels of the transmitter switch.

The invention will be described in this latter case. Also it will be assumed that a checking period is included in each vertical blanking interval, as shown by way of example in FIG. 1*a* or 1*b*.

Figure 3:
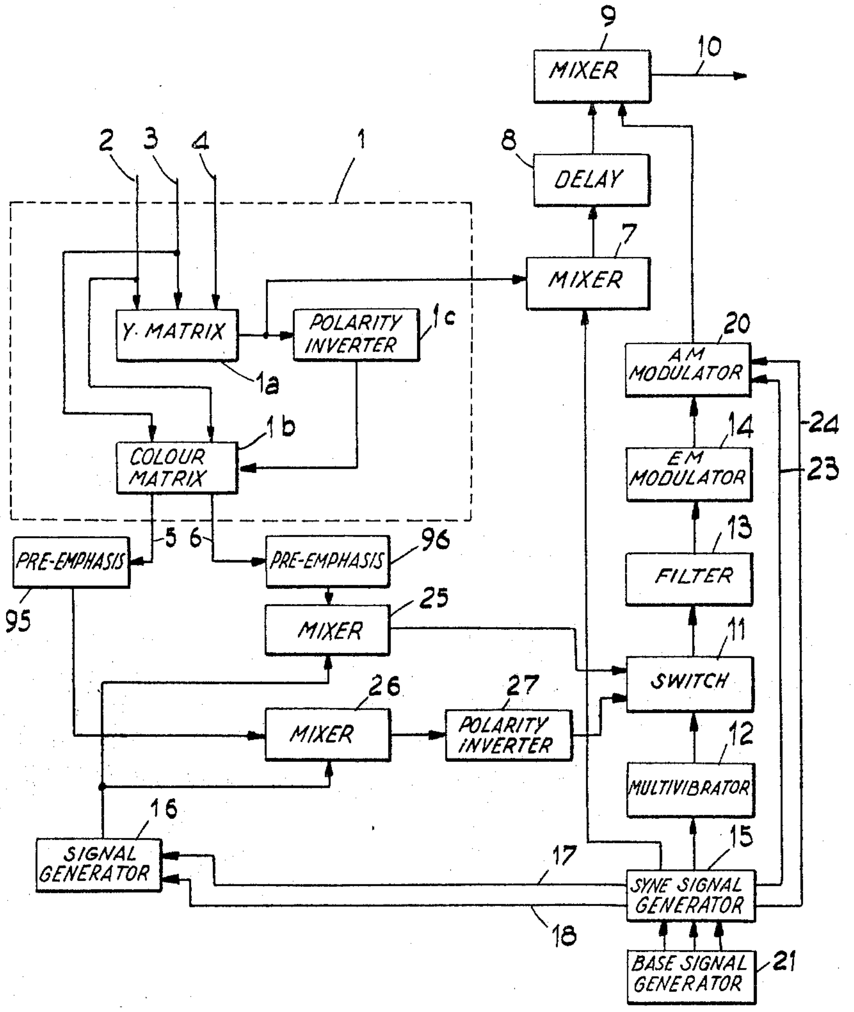
FIG. 3 is a block diagram of a part of a transmitter according to the invention.

FIG. 3 illustrates an embodiment of the transmitter circuit for providing the composite signal which is modulated on the carrier.

Only those elements of this circuit which are necessary for understanding the invention have been shown in FIG. 3.

A signal generator 15 derives all the necessary synchronization and switching signals from the base signals delivered thereto by the synchronization circuit 21 of the transmitter, for example, the horizontal blanking pulses, the vertical blanking pulses and the line and field synchronizing pulses.

Inputs 2, 3 and 4 of a matrix 1 respectively receive the gamma corrected red colour R, blue colour B and green colour G signals from a camera. Matrix 1 comprises a luminance matrix 1*a*, which is directly connected to inputs 2, 3 and 4, and delivers at its output the wide-band luminance signal Y, and a chrominance matrix 1*b*, which is connected to inputs 2 and 3, and to the output of matrix 1*a*, through a polarity inverter 1*c*. Matrix 1*b* delivers, at its outputs 5 and 6 respectively, wide band colour signals $-A_1$ and $A_2$, which are derived from signals R, B and $-Y$.

Outputs 5 and 6 of matrix 1 respectively feed two pre-emphasizing filters 95 and 96, which (in order to improve the protection against noise) emphasize the higher frequencies of signals $-A_1$ and $A_2$ relatively to the lower frequencies thereof.

The outputs of filters 95 and 96 respectively feed the first inputs of two adders or "mixers" 26 and 25, the second inputs of which are connected to the output of an identification signal generator 16. Generator 16 receives from generator 15 square-wave signals, which extend over the control periods, and signals at the line frequency. These signals are respectively delivered through connections 17 and 18.

Generator 16 delivers positive trapezoidal signals "*a*" shown in FIG. 2. A trapezoidal signal is readily obtained by means of a saw-tooth signal generator followed by a limiter, and the generation of the periodic trapezoidal signal, at the line frequency, during the checking periods is controlled by means of the aforesaid signals supplied to generator 16 by circuit 15.

Signals "$a$" are thus added, during the checking periods, to signals $-A_1$ and $A_2$ in mixers 26 and 25.

The output of the mixer 26 is connected to a polarity inverter 27 which converts the signals $-A_1$ and $a=-a_1$ into signals $A_1$ and $a_1$.

The outputs of the polarity inverter 27 and of mixer 25 are respectively connected to the two inputs of a switch 11, which is actuated by a bistable multivibrator 12, so as to provide alternately, at the output of switch 11, the signals applied to its inputs.

Multivibrator 12 is, in turn, controlled by pulses supplied thereto by signal generator 15.

Each pulse applied to multivibrator 12 triggers the latter from one of its stable states into the other, thereby changing the state of switch 11. The pulses delivered by generator 15 to multivibrator 12 are constantly at the line frequency, if the switching frequency of switch 11 is to remain constant. This regular alternation between the two states of switch 11 is discontinued during the vertical blanking intervals, before the beginning of the checking periods, preferably at the beginning of the vertical blanking interval, if it is desired, for any purpose, to modify the regular alternation of the colour signals.

The output of switch 11 is connected to a low-pass filter 13, which restricts the band-width of signals $A_1$ and $A_2$ as desired. Filter 13 feeds a frequency modulator 14, which includes an output limiter, and delivers, according to the state of switch 11, the subcarrier modulated either by signal $A_1$, or by signal $A_2$.

The output of modulator 14 is connected to the input of an amplitude modulator 20. The latter has two other inputs 23 and 24 which receive from generator 15 square-wave signals extending over the portions of the vertical blanking intervals, during which no checking occurs and the whole or part of the horizontal blanking intervals. Modulator 20 suppresses the subcarrier delivered by modulator 14 during the time intervals covered by said square-wave signals.

Output of matrix 1$a$ is also connected to a mixer 7 which also receives from generator 15, the line and field synchronizing signals, which are mixed therein with the luminance signal.

Finally, the output signals of modulator 20 and mixer 7 are mixed in a mixer 9, a delay line 8 being inserted between mixers 7 and 9, in order to equalize the times of propagation in the luminance channel and in the subcarrier channel. Output 10 of mixer 9 provides the composite signal for modulating the carrier.

It results from this description that $a_1=-a$ and $a_2=a$ are channel identifying signals in that they characterize the respective input channels of switch 11, from which they originate.

Figure 4:
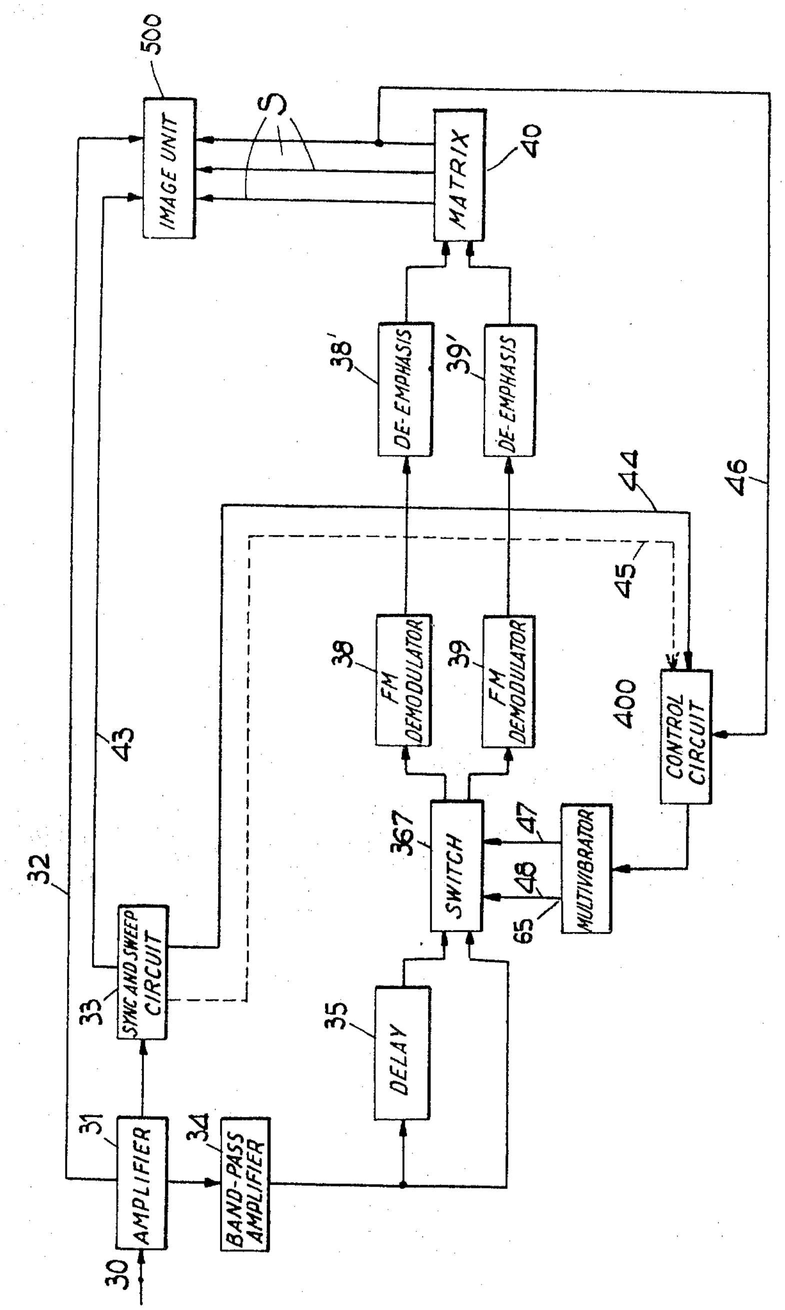
FIG. 4 is a block diagram of a part of a receiver according to the invention.

FIG. 4 diagrammatically shows an embodiment of the video circuit of a receiver adapted to operate with the transmitter of FIG. 3. Only those elements of this circuit are represented, which are necessary for the understanding of the invention.

By "video circuit" of the receiver is meant a circuit providing, from the signals resulting from the detection of the carrier, the signals necessary for the image reproducing apparatus which may, for example, include a three-gun tube.

In FIG. 4, input 30 receives the signals resulting from the demodulation of the carrier, i.e. restitutes the signal appearing at output 10 of FIG. 3. Input 30 feeds a video amplifier 31, the output 32 of which provides the luminance signal which is applied to the image reproducing apparatus 500. A second output of amplifier 31 feeds a circuit 33 which separates the synchronizing signals and produces the sweeping signals necessary for the image reproducing unit 500, and which are applied thereto through connections diagrammatically shown as a single wire 43.

Amplifier 31 also feeds a band-pass amplifier 34 which filters the subcarrier and its modulation spectrum. Output of amplifier 34 feeds in parallel two channels:

(a) A direct channel which leads to a first input of a switch 367 having two inputs and two outputs, and (b) A delayed channel which leads to the second input of switch 367 and comprises a delay device 35, imparting to the signals propagating therethrough a delay equal to one line period. Delay device 35 may be, for example, of the ultrasonic type.

In receivers of the sequential-simultaneous storage type, of which FIG. 4 is only one possible embodiment, the sequential signals are repeated and then used for two successively reproduced picture lines. It may be readily seen that, while the sequential signal $A_1$ is transmitted, switch 367 receives this signal (as yet not demodulated) on its first input and on its second input the delayed signal $A_2$ transmitted during the preceding line period. During the following line period, switch 367 receives on its first input the direct signal $A_2$ and on its second input the delayed signal $A_1$ which was transmitted during the preceding line period. Switch 367 has to switch the direct and delayed signals $A_1$ to its first output and the direct and delayed signals $A_2$ to its second output.

This arrangement makes it possible to repeat signals $A_1$ and $A_2$ and render them simultaneous, the delayed signals derived from channel 35 and relating to the previously transmitted picture line being, in the system considered, assimilated to the signals relating to the line being transmitted.

The first and second outputs of switch 367 respectively feed two frequency demodulators 38 and 39, which, if switch 367 operates correctly, respectively receive the subcarrier modulated by signal $A_1$ and by signal $A_2$. Factor $k_1$ of signal $A_1=k_1(R-Y)$ being negative, demodulator 38 is arranged in such a manner as to reverse the polarity of the demodulated signal, i.e. to deliver a signal $-A_1$ of the same polarity as $R-Y$, whereas demodulator 39 delivers a signal $A_2$ of the same polarity as $B-Y$. These signals are respectively de-emphasized in filters 38' and 39', thus restoring the correct relative amplitudes of their component frequencies.

In other words, filters 38' and 39' provide the signals $k_1(R-Y)$ and $k_2(B-Y)$, as corrected from the distortion due the pre-emphasis to which they were subjected by filters 95 and 96 of the transmitter shown in FIG. 3.

The image reproducing apparatus 500 preferably receives in addition to the wide-band signal Y, the narrow-band signals $R-Y$, $B-Y$ and $G-Y$, signal $G-Y$ being a linear and homogeneous combination of signals $R-Y$, and $B-Y$ of the type $p(R-Y)+q(B-Y)$, where $p$ and $q$ are negative constants respectively equal to $-0.3/0.59$ and $-0.11/0.59$.

The de-emphasis filters 38' and 39' feed a matrix 40, which derives, by means of linear operations, from signals $-A_1$ and $A_2$ applied thereto, the three difference signals $R-Y$, $B-Y$ and $G-Y$. These three signals are collected on the three outputs S of matrix 40 and applied to the image reproducing apparatus 500.

The tricolour reproducing apparatus is fed, as concerns the reproduction of the red, blue and green luminous components, respectively by the sum of $(R-Y)$ and Y, the sum of $(B-Y)$ and Y, and the sum of $(G-Y)$ and Y.

It should be noted that term Y forming part of the "difference signals" does not contain the higher frequencies of the luminance signal Y and that the latter frequencies will be common to the reproducing guns of the luminous components blue, red and green.

The matrix supplies the aforesaid colour difference signals only during the transmission of the picture signals, provided the phase of switch 367 is correct.

During the checking periods, matrix 40 operates, respectively, on the identification signals $-a_1$ and $a_2$, in the same way as it operated on signals $-A_1$ and $A_2$.

Since signals $-a_1$ and $a_2$ are of positive polarity, it is easily seen that, if the switch operates correctly, the matrix delivers, during the check periods:

(a) Positive trapezoidal signals $(-a_1)/(-k_1)=a_1'$, at that output S, say output $S_1$, which is assigned to the picture signal $R-Y$;

(b) Positive trapezoidal signals $a_2/k_2=a_2'$, at its output $S_2$ assigned to the picture signal $B-Y$;

(c) Negative trapezoidal signal $pa_1'+qa_2'$ ($p$ and $q$ being negative), at its output $S_3$, assigned to the picture signal $G-Y$.

If the receiver switch does not operate correctly the as yet not demodulated signals $-A_2$ and $-a_2$ appear at its first output and the as yet not demodulated signals $A_1$ and $a_1$ at its second output. Thus, demodulator 38 delivers the video frequency signals $-A_2$ and $-a_2$, and demodulator 39 signals $A_1$ and $a_1$.

Thus matrix 40 receives signal $-A_2$ at its input assigned to signal $-A_1$, and signal $A_1$ at its input assigned to signal $A_2$; accordingly it delivers wrong signals at its outputs S.

It may be readily seen that, during the check periods, matrix 40 delivers:

(a) Negative trapezoidal signals $(-a_2)/(-k_1)=-a_1'$, at its output $S_1$;

(b) Negative trapezoidal signals $a_1/k_2=-a_2'$, at its output $S_2$;

(c) Positive trapezoidal signals $-pa_1'$, $-qa_2'$ ($p$ and $q$ being negative), at its output $S_3$.

Each one of the output channels of matrix 40 may therefore be used as a check channel for the control of switch 367.

The latter is directly controlled by a two-states signal generator, such as a bistable multivibrator 65.

The bistable multivibrator 65 is tripped from one of its states into the other by each pulse received from the circuit 400 according to the invention. Circuit 400 has one input 46 connected to the output S selected as a check channel, a second input 44 receiving pulses at the line frequency from circuit 33 and, possibly a third input 45 receiving an auxiliary signal at the field frequency, also provided by circuit 33.

Circuit 400 is arranged for passing regularly to multivibrator 65 the pulses at the line frequency applied to its input 44, as long as the signal collected from the check channel is not indicative of a wrong phase of the receiver switch, and for modifying, in the reverse case, the regular sequence of these pulses at the line frequency, through adding thereto a supplementary pulse or suppressing a pulse therefrom, so as to restore the correct phase of generator 65, and consequently of switch 367.

The signals fed to circuit 400 by circuit 33, respectively through connections 44 and 45, are advantageously the horizontal and vertical sweep signals.

As is well known, each of these signals comprise pulses having a high level relatively to the rest of the signal, i.e. the horizontal retrace pulses, at the line frequency, as concerns the horizontal sweep signal, and the vertical retrace pulses, at the field frequency, as concerns the vertical sweep signal.

These pulses build up the useful portions of the signals respectively applied to inputs 44 and 45 of circuit 400.

Circuit 400 may be arranged in various manners. A few embodiments of this circuit are described hereinbelow only by way of nonlimitative examples.

Figure 5:
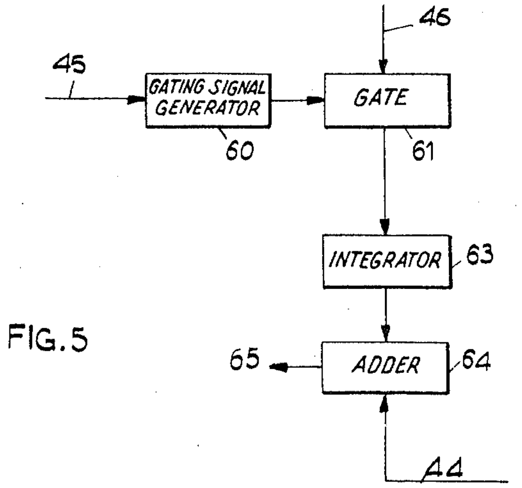
FIG. 5 is a more detailed block diagram of the switch control circuit of the receiver of FIG. 4.

In FIG. 5, an embodiment of circuit 400 is illustrated. This circuit makes use of an auxiliary signal, at the field frequency, by means of which it is coupled to the check channel only during the checking periods.

A gating signal generator 60 receives on its input 45 the vertical retrace signals delivered by circuit 33 and derives therefrom a signal which terminates at least approximately with the checking period.

Circuit 60 may, for example, comprise a monostable multivibrator which is tripped into its unstable state by the rear edge of the vertical retrace signals.

The gating signal is applied to the control input of a gate 61, the signal input 46 of which is connected to the output $S_1$ of matrix 40, which delivers, during the checking periods, a positive signal if the phase of the switch is correct and a negative signal in the opposite case. The output signal of gate 61 is applied to an integrator 63, comprising, for example, a diode which feeds an R–C circuit through a load resistance R′, the direction of connection of the diode being so selected that integrator 63 integrates only the negative signals applied to its input. The output of integrator 63 is connected to the first input of an adding circuit 64, the second input 44 of which receives from circuit 33 the horizontal retrace pulses.

The output of the adding circuit 64 is connected to the control input of a bistable multivibrator 65, which changes its state upon the application of a positive control pulse.

Circuit 64 causes the state of multivibrator 65 to change at the line frequency when circuit 63 does not receive any signal from gate 61, i.e. when the latter is blocked and also if the second input of adder 64 is not fed, i.e. if the phase of switch 367 is correct during the time intervals when gate 61 is active. Actually in this case, input 46 receives a positive signal.

It will now be assumed that at the beginning of a checking period, the phase of switch 367 is not correct, i.e. that input 46 receives a negative signal.

Figure 6:
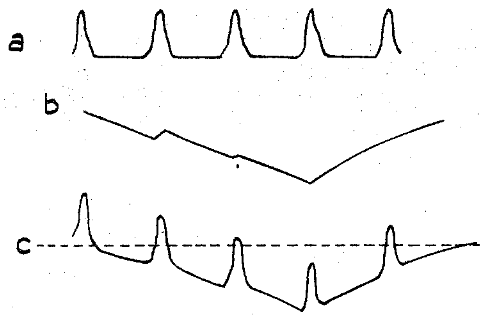
FIG. 6 is a graph illustrating the operation of the circuit of FIG. 5.

Integrator 63 delivers, by integrating the negative signals incoming from gate 61, a signal which keeps growing more and more negative as shown at the start of the curve of FIG. 6*b*.

The output of adder 64 delivers the sum of the horizontal retrace pulses shown in FIG. 6*a* and of the voltage in FIG. 6*b*, this sum being represented in FIG. 6*c*.

In this example, the charging time constant of the integrating device 63 is selected such that, under these conditions, the output signal of integrator 63 becomes so negative that the fourth horizontal retrace pulse following the beginning of the checking period cannot trip multivibrator 65.

Under these conditions, multivibrator 65 "skips" one tripping and switch 367 resumes the correct phase i.e. is restored in phase with the transmission switch. A correct signal, i.e. a positive signal will thus appear at the input 46, so that the output voltage of device 63 starts increasing again.

In FIG. 5, it was assumed that constants R, C, R′ of circuit 63 are such that the discharging time constant of integrator 63 is of the order of its charging time constant and therefore, the fifth pulse at the line-frequency, following the beginning of the checking period, can again trip the bistable multivibrator 65. It is possible, and even desirable, to have a time constant which is shorter at the discharge than at the charge, if the restoring of the correct phase is to be operated by skipping a single triggering of multivibrator 65.

Figure 7:
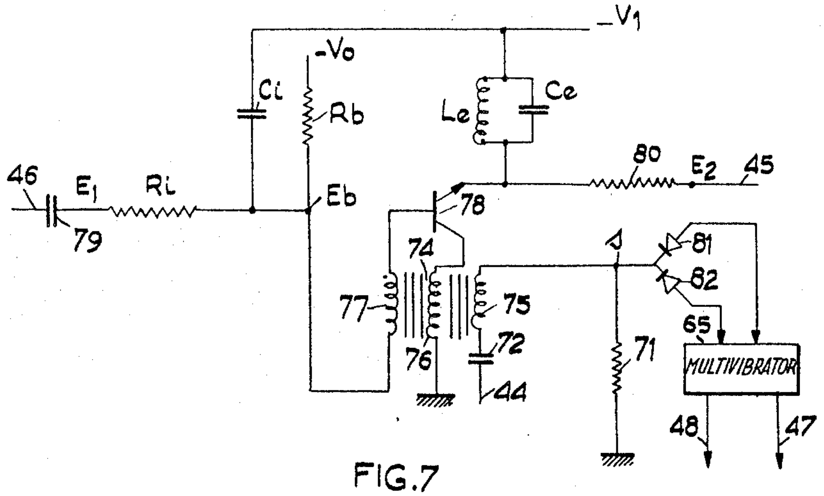
FIG. 7 shows in detail another embodiment of the switch control circuit of the receiver of FIG. 4.

FIG. 7 is a more detailed, although still diagrammatical, showing of an embodiment of circuit 400, wherein, as in the circuit of FIG. 5, the presence of a test signal indicative of a wrong phase of the receiver switch 367 modifies the regular sequence of the pulses at the line frequency applied to input 44.

Also in this case an auxiliary signal at the field frequency is used for preventing picture signals from initiating the modification of this regular sequence in lieu of test signals.

As to the input 46 of circuit 400, it is now connected to output $S_3$ of matrix 40 shown in FIG. 4. Accordingly, during the checking periods input 46 receives negative signals if the phase of switch 367 is correct, and positive signals in the opposite case. Inputs 44 and 45, which deliver respectively the horizontal and vertical retrace signals, are again shown.

Input 46 is connected to a coupling capacitor 79, followed by a resistance R*i*, the second terminal E*b* of which is connected through a capacitor C*i* to a negative voltage source $-V_1$; through a resistance R*b* to a negative voltage source $-V_o$, with $V_o>V_1$, and consequently $-V_o<-V_1$; and through the secondary winding 77 of a transformer 74 to the base of an n-p-n transistor 78, the collector of which is grounded through the primary winding 76 of transformer 74. A further secondary winding 75 of transformer 74 has one terminal connected to an input 44, through a capacitor 72, and its other terminal connected to the cathodes of two diodes 81 and 82. The anodes of these diodes are respectively connected to the two inputs of a bistable multivibrator 65.

The point *s*, common to diodes 81 and 82, is grounded through resistance 71.

The emitter electrode of transistor 78 is connected to the voltage source $-V_1$ through a resonant circuit comprising an inductance coil L*e* and a capacitor C*e* in parallel. The tuning frequency of this circuit will be indicated later.

Input 45, which receives the vertical-retrace signals, is connected, through a resistance 80, to a point common to the emitter electrode of transistor 78 and to the resonant circuit L*e*-C*e*.

The arrangement operates as follows:

When transistor 78 is blocked, point *s* receives only the horizontal retrace pulses from input 44 through capacitor 72 and winding 75.

These negative pulses are passed through diodes 81 and 82 and trip the multivibrator 65 at the line frequency.

Now transistor 78 remains blocked as long as its base electrode is at a potential which is negative with respect to that of the emitter electrode. This occurs, in particular, if capacitor C*i* has its rest charge, for which point E*b* and the transistor base are at the potential $-V_o$, and if no signal is applied to input 45, the emitter electrode being then at potential $$-V_1>-V_o, \text{ since } V_o>V_1$$

The transistor is of course also blocked if, on account of an additional charge taken by capacitor C*i*, point E*b* is brought to a potential which is more negative than $-V_o$.

It will be seen later in this description, that, at the end of a checking period, capacitor C*i* has always a charge bringing point E*b* to such a potential.

Outside the vertical blanking intervals, no signal is applied to input 45 and input 46 receives the picture signals $G-Y$, appearing at the output $S_3$ and which are always comprised between two well defined limit-values, which are respectively positive and negative.

These signals are integrated at the terminals of capacitor C*i* in the integrator device C*i*, R*i*, R*b*.

If these signals are positive on the average, the electrode of capacitor C*i* connected to point E*b* will take up an additional positive charge, and therefore the potential of point E*b* will increase in a direction tending to unblock the transistor.

Taking into account the maximum value of $G-Y$, and since point E*b* can never be raised to a potential higher than this maximum value during the generation of signal $G-Y$, the absolute value $V_o$ of voltage $-V_o$ is to be taken sufficiently high for the transistor never to be unblocked under the sole action of signal $(G-Y)$.

As will be seen later, $V_o$ is taken still slightly higher than this limit.

Transistor 78 is therefore always blocked, outside of the vertical blanking intervals.

It remains to consider what occurs during each of these intervals.

It will be recalled that the subcarrier is eliminated during those portions of the vertical blanking intervals which are not occupied by the checking periods and that output $S_3$ of matrix 40 thus delivers no signal during the aforesaid vertical blanking interval portions. Such would also be the case if the subcarrier were not eliminated, but simply not modulated.

At the beginning of the vertical blanking intervals, no signal is applied either to input 46 or to input 45 and the transistor remains blocked.

The vertical retrace signal occurring during the period A of FIG. 1*a*, is then applied to input 45 and excites the L*e*-C*e* circuit.

Figure 8:
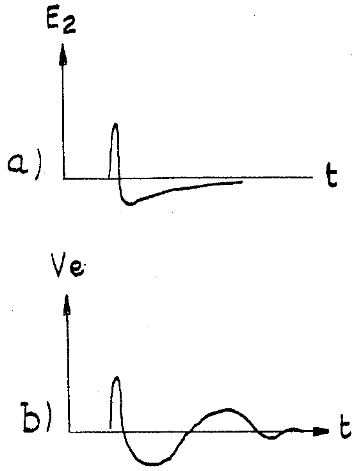

The graph of FIG. 8*a* shows the vertical retrace pulses appearing at terminal $E_2$ of resistance 80, the time being plotted along the abscissae and the corresponding voltage $E_2$ along the ordinates. Therefore, voltage V*e* across the terminals of the resonant circuit evolves as shown in FIG. 8*b*, where the time is also plotted along the abscissae and the voltage V*e* on the ordinates. The first negative alternation of the oscillating signal V*e* covers the time interval $t_1-t_2$. The instant $t_1$ is determined by the instant when the vertical retrace signal is applied. Instant $t_2$ may be adjusted by varying the tuning frequency of circuit Lc-C*e*. The relative amplitude of the second negative alternation with respect to the first may be adjusted by varying the damping due to the resistance of coil L*e*, and if need be, through inserting an additional resistance in one of the branches of the circuit, so that the amplitude of the second negative alternation should be much lower than that of the first.

The instant $t_2$ is fixed in such a manner that it is approximately at the end of the checking period D (see FIG. 1*a*) without going beyond the vertical blanking time interval. The amplitude of the second negative alternation is so adjusted that it is unable, considering the voltage value $-V_o$, to unblock transistor 78 during the transmission of the picture signals.

The negative voltage thus applied during interval $t_1-t_2$ to the emitter of the transistor tends all the more to unblock the same, as it is more negative; the amplitude of the first negative alternation is, however, so adjusted that it is not sufficient to ensure the unblocking, even at the instant of its maximum value.

However, once the checking period D has begun, input 46 receives signals from output $S_3$. These signals are integrated at the terminals of capacitor C*i* by the integrating device R*i*-C*i*-R*b*.

At the beginning of the checking period, the voltage of point E*b* is equal to $-V_o$, since during the portion $A+C$, as shown in FIG. 1*a*, of the vertical blanking interval, the subcarrier is eliminated and the constants of the integrator are so selected that point E*b* recovers the voltage $-V_o$ in the course of a time interval equal, at most, to $A+C$.

If the phase of the switch is correct, the signals applied to input 46 are negative, and the negative voltage applied to the base of transistor 78, through capacitor C*i*, becomes more and more negative. Accordingly, transistor 78 cannot be unblocked during the vertical blanking interval considered.

Circuit 400 will thus continue to deliver to multivibrator 65 the pulses at the line frequency.

If, on the contrary, the signals at output $S_3$ are positive, and accordingly indicative of a wrong phase, the positive charge, integrated on that armature of capacitor C*i*, which is connected to point E*b*, will ultimately reach a level sufficient for the voltage at point E*b* to be positive enough with respect to that applied to the emitter of the transistor 78, for the latter to be unblocked.

From this instant, the transistor will operate as a blocking oscillator, as the negative output signal of the collector electrode is not only collected on point *s* to which it is passed, without reversing its polarity by the secondary winding 75 of transformer 74, but is also passed to the base of transistor 78 with a polarity reversal by winding 77.

This cumulative process goes on while the plate of capacitor C*i* connected to point E*b* is charged negatively, finally resulting in the re-blocking of transistor 78. The negative pulse collected at point *s* during the unblocking of the transistor 78, is passed through the diodes 81 and 82 to the two inputs of multivibrator 65 and causes an additional tripping thereof and thus resets switch 367 in phase with the transmitter switch. The signals appearing at input 46 become then negative and contribute to reinforce the blocking of the transistor 78.

The width of the phase-restoring pulse depends of course on the parameters of the blocking oscillator.

It will now be shown that there always occurs one and only one additional pulse, at point *s*, during the checking period considered.

It will first be shown that the pulse collected in the course of the described procedure is actually an additional pulse, i.e. it does not coincide in time with one of the pulses at the line frequency applied to input 44.

Figure 9:
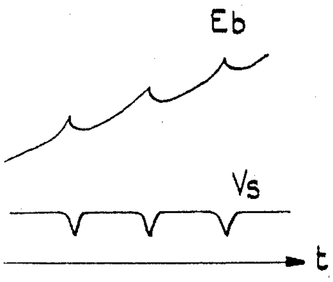
FIGS. 8 and 9 are graphs illustrating the operation of the circuit of FIG. 7.

This is clear from results shown in FIG. 9 representing the simultaneous evolution, as a function of time, of voltage V*s* at input 44 and of voltage E*b* appearing at the point E*b* common to R*b*, R*i* and C*i*.

Voltage E*b* increases during the application to input 46 of the trapezoidal signals. During the time intervals separating the trapezia shown in FIG. 2, voltage E*b* decreases slightly, due to a partial discharge of capacitor C*i*. In other words, during the application of the horizontal-retrace pulses, voltage E*b* decreases; it is not, therefore, during the corresponding time intervals that it may reach the level necessary for providing an additional pulse for tripping the multivibrator.

It may also be seen that transistor 78 delivers only one pulse as the constants of the circuit are so selected that the negative charge taken up by the armature of capacitor C*i* which is connected to point E*b* during the unblocking of the transistor is sufficient to maintain the transistor blocked during the remainder of the time interval $t_1-t_2$. The duration of this blocking depends on the discharge time constant C*i*R*t*, of the circuit, R*t* designating the combination of all the resistances in parallel with capacitor C*i*, i.e. the resistance R*i*. $Rb/(Ri+Rb)$ if the internal resistance of the generator of the signal applied to input 46 may be disregarded. During the remainder of time interval $t_1-t_2$, the signals applied to input 46 are moreover negative, thus rendering easy the achievement of this condition.

This time constant should therefore be such that it is (a) sufficiently small to ensure the restoring to its rest voltage of capacitor C*i* during the time interval $A+C$ and (b) sufficiently large in order that, during the time intervals $t_1-t_2$, two additional pulses may not be collected at joint *s*.

By changing the direction of winding of the secondary winding 75 and by adjusting the constants of the blocking oscillator incorporated in the circuit of FIG. 7, it is possible to obtain at point *s* upon the unblocking of transistor 78, rather than a comparatively short negative pulse, a positive pulse which, if its duration is equal to that of one picture line and its amplitude sufficient, will "damp" a negative line-retrace pulse applied to input 44.

Thus, the phase restoring of the switching device is obtained by skipping one tripping of multivibrator 65 instead of imparting thereto an additional tripping.

The above described embodiments of circuit 400 made use of a signal at the field-frequency in order to avoid any undesired initiation of the operation of the system which resets in phase the receiver switch, by picture signals. However, it is also possible not to resort to this signal.

It will suffice, for example, if the phase of the switch is wrong, that the test signal reaches an extreme, i.e. a maximum or a minimum level, sufficiently different from the extreme level of the same polarity of the picture signals which propagate in the check channel, for causing the switch to change its phase, without running the risk of having the same action caused by the picture signals. In the normal case, where an integrated test signal is used (which, in the absence of any gating or similar device between the test channel and the circuit which controls the switch, will also result in the integration of the picture signals), a difference between the result of the integration of the test signals and that of the integration of the picture signals taking into account the time constant at the discharge of the integrating circuit, will be all the easier reached as the test signal will have this extreme level during a longer interval of time.

It should be noted that, under the transmission condition considered here, trapezoidal signals are effectively obtained at the output $S_3$ of matrix 40, the maximum positive and negative levels of which extend beyond the variation interval of the picture signals $V-Y$ delivered at this output.

This results from the expression of $(V-Y)$ as a function of $(R-Y)$ and $(B-Y)$, and because $(R-Y)$ and $(B-Y)$, as is known, cannot take up simultaneously their maximum algebraic values, nor their minimum algebraic values.

Thus, while making full use of the modulation capacity of the subcarrier both for the picture signals and the identification signals, any auxiliary signal at the field frequency may be dispensed with provided device 400. shown in FIG. 4, is adjusted accordingly and output $S_3$ of matrix 300 is selected as the test channel.

In fact, this latter condition need not be considered if signals $A_1$ and $A_2$ are strongly pre-emphasized in filters 95 and 96 of the transmitter shown in FIG. 3. This actually occurs in the preferred embodiment of the sequential-simultaneous system with memory considered here.

As is well known, pre-emphasis results in a widening of the variation interval of the signal, which depends on the form thereof, but which may be deliberately limited, for example by means of a double clipper, care being however taken not to introduce thereby any exaggerated distortions, since the latter are not compensated at the reception.

For an initial variation range of the signals $k_1(R-Y)$ and $k_2(B-Y)$ extending from $-1$ to $+1$, the variation range of the pre-emphasized signals is for example limited to a range extending from $-2$ to $+2$, to which range the whole of the frequency swing of the subcarrier is caused to correspond.

The identification signal $a=a_2=-a_1$ is then taken with a maximum level equal to or in the neighbourhood of 2.

At the transmission, and such is the case in FIG. 3, the identification signals may be injected into their respective channels after the picture signals have been preemphasized. In this case, the identification signals are not pre-emphasized. They may also be subjected to pre-emphasis, just as the picture signals, in the output channel of the transmitter switch. In this case, the double-clipping eliminates possible peaks of these signals extending beyond an absolute level equal to 2.

In both cases, the signal derived from the frequency demodulators 39 and 38 are de-emphasized at the reception in de-emphasizing filters 38' and 39'. The identification signals may undergo distortions, which are different according to whether they have been pre-emphasized or not, but the small bases of the trapezes remain at level of 2 or $-2$.

It may be readily seen that, under these conditions, the trapezoidal signals collected at the outputs $S_1$ and $S_2$ have either positive or negative levels which are double the maximum levels of the picture signals of the same polarity, collected in these channels, the difference being still greater as relates output $S_3$.

The three outputs $S_1$, $S_2$ and $S_3$ may, under the conditions mentioned, be readily used as checked channels, with a circuit arrangement which does not use signals at the field-frequency.

This may be done for example in conjunction with a very simple switch controlling arrangement 400, wherein the integrated test signal controls a gate to which the signals at the line frequency are applied.

Figure 10:
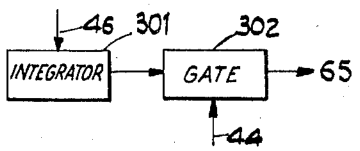
FIG. 10 is a block diagram of another embodiment of the switch control circuit of the receiver of FIG. 4.

A block-diagram of such an arrangement is shown in FIG. 10, in the case where input 46 of circuit 400 is connected, for example, to output $S_1$ of the matrix 40 shown in FIG. 4 and providing a negative signal when switch 367 has a wrong phase.

The signals appearing at input 46 are integrated in the integrating circuit 301, the output of which is connected to the control input of a gate 302. The latter receives at its input 44 pulses at the line frequency.

Gate 302 is arranged in such a manner that it is unblocked as long as the signal applied to its control input is algebraically higher than a level —V*m*. This level and the constants of the integrator circuit 301 are selected in such a manner that level —V*m* is rapidly reached upon appearance of a negative test signal, but cannot be reached by integration of the picture signals.

Preferably, circuit 301 comprises a diode which allows only negative signals to be integrated. Consequently, gate 302 will be always active except if a negative test signal occurs.

If the gate is active the pulses applied to the input 44 normally pass through gate 302 and drive the switching signal generator 65 into its other state.

When a negative test signal appears at output $S_1$, the integrated signal readily reaches level —V*m*, thus blocking gate 302 and the following retrace pulse, which appears between two successive trapezoidal signals, is stopped by the gate. Multivibrator 65 "skips" one change of state and switch 367 is thereby reset in the correct phase, i.e. the trapezoidal signal which follows the retrace pulse stopped by gate 302, is positive. The time constant of the integrator is, in addition, so selected that the output signal raises algebraically above level —V*m* during one active line time interval.

Besides the advantage of its simplicity, the system described has the same advantage as the systems described above that the normal switching at the line frequency goes on should the identification signals disappear for a short duration. Such a purely accidental disappearance may be due to a faulty propagation or result for example, from a switching at the transmission from one source of picture signals to another.

Since, once the receiver switch has been set in a correct phase at the starting of its operation, the probability of a wrong phase of the receiver switch is very small, at least if the regular alternation of the two colour signals is not discontinued between two fields at the transmission end, the probability of a coincidence between a wrong phase of the receiver switch and of a temporary absence of the identification signals is so small, that this feature proves on the whole to be advantageous.

Figure 11:
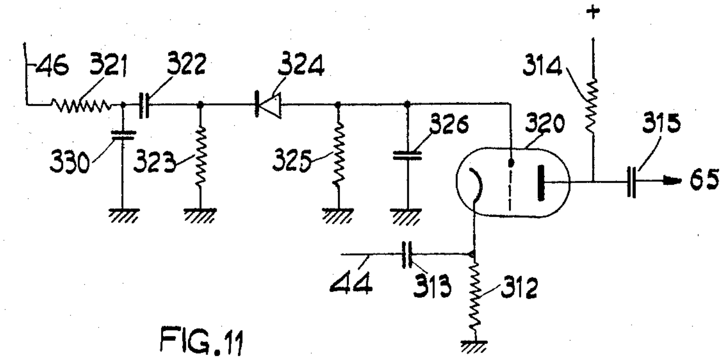

FIG. 11 illustrates a detailed embodiment of the invention in the case when the pulses at the line frequency are negative.

Such pulses are advantageously picked up from the horizontal sweep transformer which feeds the sweep signals to the horizontal deflection system of the image reproducing tube.

In FIG. 11, a triode 320 is used as a gating device. Its anode is connected to positive high-voltage source through a load resistance 314.

The pulses at the line frequency are applied to the cathode of triode 320 through a capacitor 313, the cathode being grounded through a resistance 312 through which flows the continuous component of the cathode current.

Input 46, which is connected to output $S_1$ of matrix 40, is also connected to the grid of triode 320 through a circuit comprising a resistance 321, a capacitor 322 and a diode 324, the latter being connected to the grid by its anode.

The anode of diode 324 is grounded through a resistance 325 and a capacitor 326 in parallel. The junction point of capacitor 322 with the cathode of diode 324 is grounded through a resistance 323 and the junction point of resistor 321 with capacitor 322 is grounded through a capacitor 330.

The signals appearing at input 46 are passed to the cathode of diode 324 through the network 321–322 after having been subjected to a low-pass filtering, which eliminates the frequencies higher than those of the order of the line sweep frequency, by means of circuit 321–330. The negative signals which flow through diode 324 charge capacitor 326 negatively with respect to ground, whereas the other signals flow through resistance 323. The blocking voltage —V*m* may be adjusted, by conveniently selecting resistance 312, so that it is rapidly reached with a negative test signal, but never by the integration of the negative picture signals.

The triode will be thus always unblocked, except if a negative test signal appears at 46. When the triode is unblocked, the amplified pulses collected on the anode are passed to multivibrator 65 through a capacitor 315.

A blocking of the triode will result in a non transmission of thet following pulse and the restoring of the correct phase of the switch. Resistance 325 is selected such that capacitor 326 is sufficiently discharged for the triode to be unblocked when the pulse following the resetting in phase is applied.

Figure 12:
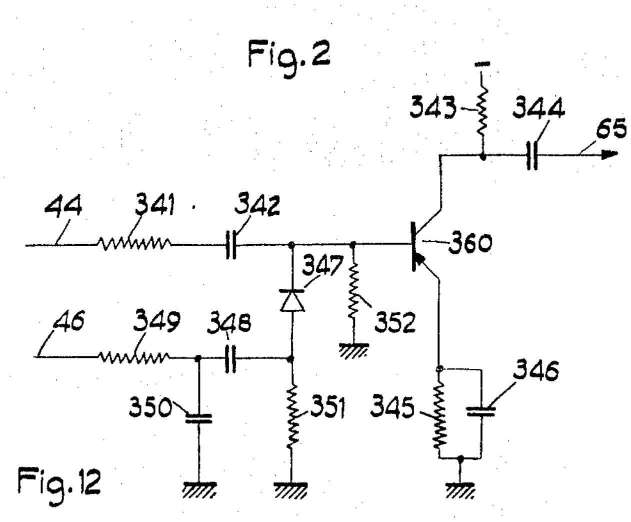
FIGS. 11 and 12 illustrate embodiments of a switch control circuit according to the block diagram of FIG. 10.

FIG. 12 is an alternative embodiment of this circuit, which uses a transistor instead of a triode. It is also assumed that in this case the test signal is collected at the output $S_3$ of matrix 40 and that consequently it is negative when the switch has the correct phase.

In FIG. 12, transistor 360, of type p-n-p, has its collector electrode connected to a negative voltage source through a load resistance 343.

The pulses of the line frequency are applied to the base at the transistor through a decoupling circuit in series comprising, starting from input 44, a resistance 341 and a capacitor 342.

The base of transistor 360 is connected to input 46, and consequently to output $S_3$ of matrix 40, through a circuit comprising in series a resistance 349, a capacitor 348 and a diode 347, the latter having its cathode connected to the base of the transistor. The junction point of resistance 349 and capacitor 348 is grounded through a resistance 350. The junction points of diode 347 with capacitor 348 and the base of the transistor are respectively grounded through resistances 351 and 352.

The signals appearing at output $S_3$ undergo in the integrator circuit 349–350 a low-pass filtering which eliminates the higher frequency components and passes only the components of the same order as the line frequency or lower. The positive signals which flow through diode 347 charge capacitor 342 which operates as an integrator, in addition to its decoupling function, the other signals flowing through resistance 351.

Resistance 352 is the discharging resistance of capacitor 342. The emitter of transistor 360 is grounded through a self-bias resistance 345 which is connected in parallel with the bypass capacitor 346.

The operation is similar to that of the circuit shown in FIG. 11, the transistor being blocked when a positive voltage +V′ is applied to its base, this positive voltage V′ being adjusted by suitably selecting resistance 345.

Figure 13:
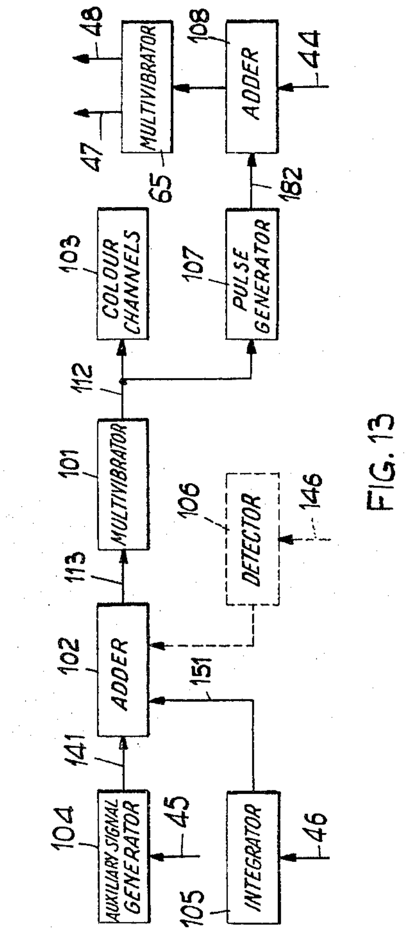
FIG. 13 is a block diagram of a circuit combining the switch control circuit of the receiver of FIG. 4, and a color killer circuit.

The circuit shown in FIG. 13 combines the switch control circuit with a colour killer circuit, i.e. a circuit automatically blocking the colour channels of the receiver when the latter is used for receiving a black and white television programme.

For short, the term "achrome" will be henceforth used instead of "black and white."

The sequential-simultaneous system with memory so far considered is a compatible system, which means that signal Y can be used in achrome receivers for obtaining an achrome picture. This means again that signal Y is transmitted according to the same standards as the single picture signal of the achrome television, the latter being in fact very similar to signal Y.

Conversely, the signal of the achrome television can be used by the receivers of the sequential-simultaneous system with memory considered here for obtaining an achrome picture.

It has already been mentioned that the signals used for the reproduction of the red, blue and green components of the picture are respectively of the form:

$$Y+(R-Y)$$
$$Y+(B-Y)$$
$$Y+(G-Y)$$

The addition of Y to the colour components $(R-Y)$, $(B-Y)$ and $(G-Y)$ derived from the transmitted colour signals $A_1$ and $A_2$, may be effected in the tricolour tube itself. If this is a three-gun tube, voltage $-Y$ is applied to the cathodes of all the three guns while voltages $(R-Y)$, $(B-Y)$ and $(G-Y)$ are respectively applied to the control electrodes of the three guns.

Under these conditions, the use of the picture signal of an achrome television programme by the colour television receivers is made particularly simple. As is well known, the television tricolour tubes are such that the application of signals of the same level to the three guns brings about the production of red, blue and green luminous components, the resultant of which is achrome.

Consequently, the colour television receiver operates on the carrier wave, modulated by an achrome signal, exactly as it operates on the carrier wave of a colour television transmission, to supply an achrome picture.

However, it is then necessary to block the colour channels of the receiver, i.e. those channels which are fed with the colour sub carrier and supply signals $A_1$ and $A_2$ when a colour programme is being received. If this is not done, these channels, which in this case are no longer fed with the colour subcarrier, would receive that portion of the spectrum of the achrome signal which is occupied by the modulated subcarrier in a colour transmission and would supply parasitic signals giving rise, on the image reproduced, to colour components without any relation with those of the original picture.

Devices, automatically effecting this blocking of the colour channels of the receiver are known as colour killers.

When the sequential-simultaneous system considered is operated with conventional identification signals at the line frequency, or at half the line frequency, the colour killer is advantageously controlled according to the presence or absence of those identification signals, their presence being indicative of the presence of corresponding colour signals.

The channel identifying signals according to the invention i.e. signals at the field frequency, can also be used for operating the colour killer, provided the blocking or the unblocking of the colour channels which is initiated during the checking periods should be maintained until the beginning of the field blanking interval comprising the next checking period.

A circuit to that effect may be designed in a variety of ways within reach of those skilled in the art.

According to a preferred embodiment the following arrangements are made:

(a) The colour killer is set in a predetermined state in the course of each vertical blanking interval and is then either maintained in this state or reset in its other state before the end of the considered vertical blanking interval in accordance with the signal collected from the checked channel during the checking period;

(b) The receiver switch is controlled through the intermediary of the colour killer.

There is thus obtained a particularly simple and reliable circuit for performing both the colour killing and switch controlling operations.

It will be assumed in this example that at all times, i.e. also during the vertical blanking intervals, the receiver switch is driven from one state to the other at the line frequency, except if an undesired disturbance occurs.

In FIG. 13, inputs 44 (pulses at the line frequency), 45 (pulses at the field frequency) and 46 (test signal) of circuit 400 of FIG. 4 are again shown.

Input 46 is now connected to output $S_3$ of matrix 40 of FIG. 4 so that the test signal is negative if the phase of switch 367 is correct.

A bistable multivibrator 101 supplies on its output 112 a signal, the level of which depends upon the state of the multivibrator, and which is used as a biasing voltage for blocking or unblocking the colour channels of the receiver, the latter channels being represented by block 103. This biasing voltage may be applied for example to each of the output channels of switch 367, in particular to amplifiers, or to the limiters, for example of the transistorized type, of the frequency demodulators 38 and 39 shown in FIG. 4.

Symbols "0" and "1" will be used to designate the two states of multivibrator 101 which correspond respectively to the blocking and the unblocking of the colour channels.

Output 112 of multivibrator 101 is also coupled to a circuit 107, which delivers a pulse when multivibrator 101 changes from state "1" to state "0," and does not deliver any pulse when the multivibrator changes from state "0" to state "1.'

An adding circuit 108 has two inputs. One of them is the already mentioned input 44 which receives pulses at the line frequency. Its other input 183 is coupled to the output of circuit 107. The pulses delivered by this latter circuit are thus inserted in the sequence of the retrace pulses at the line frequency which are applied to input 44.

The output of circuit 108 is connected to the single input of the bistable multivibrator 65 which controls switch 367 as shown in FIG. 4.

From the above description of FIG. 13 it follows that at the instant the colour channels change from the unblocked state to the blocked state, the phase of the receiver switch 367 also changes.

Multivibrator 101 is controlled by the output 113 of an adding circuit 102 which is fed in the following way:

It receives on its first input 141, connected to the output of a circuit 104, a signal $U_4$. The input of circuit 104 is the already mentioned circuit input 45 which supplies pulses at the field frequency. The signal $U_4$ derived therefrom by circuit 104 is a periodic signal at the same frequency. It is shaped to have a minimum and a maximum and is such, that, under its sole action, multivibrator 101 is triggered into its state "1," unless it is already in this state, at a predetermined instant $T_1$ of that portion of the vertical blanking interval which precedes the checking period, and is returned into state "0" at an instant $T_3$ of the checking period.

FIG. 14*a* shows signal $U_4$ as a function of time during a vertical blanking interval.

As is known, a bistable multivibrator can be controlled by means of signals applied to a single input. These signals have then a level $A_{40}$ and a level $A_{41}$, with level $A_{41}$ lower than level $A_{40}$, and the multivibrator cannot change its state for an input signal whose level is comprised between $A_{41}$ and $A_{40}$ but is triggered into state "1" for a signal lower than $A_{41}$ and into state "0" for an input signal higher than $A_{40}$.

Figure 14:
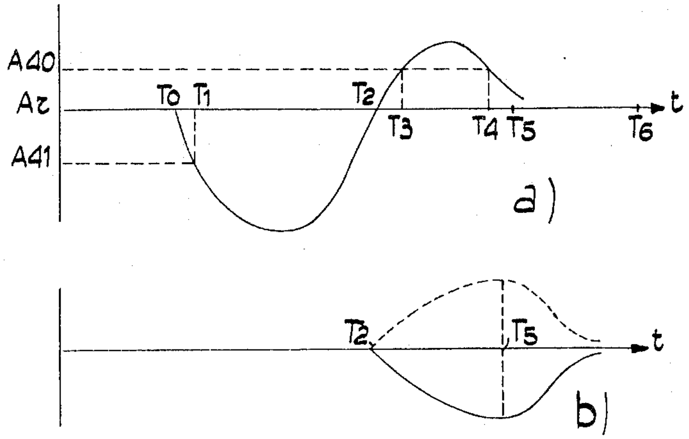
FIG. 14 is a graph illustrating the operation of the circuit of FIG. 13.

In FIG. 14, the notations $T_o$, $T_2$, $T_5$ and $T_6$, at least approximately, correspond respectively to the following instants:

$T_o$: the beginning of the vertical retrace periods, i.e. an instant within interval A of FIG. 1*b*;
$T_2$: to the beginning of the checking period D as shown in FIG. 1*b*;
$T_5$: to the end of the checking period D;
$T_6$: to the end of the vertical blanking interval.

Before instant $T_o$, signal $U_4$ is at its rest level *Ar*.

From $T_o$ to $T_2$, it is lower than *Ar* and goes through a minimum which is algebraically lower than $A_{41}$, the latter value being taken up by signal $U_4$ for the first time at instant $T_1$.

From instant $T_2$ to instant $T_5$ signal $U_4$ is higher than level $Ar$ and goes through a maximum higher than $A_{40}$, the latter value being taken up by signal $U_4$ for the first time at an instant $T_3$ and for the second time at an instant $T_4$.

Beyond instant $T_5$, signal $U_4$ has a level which is practically zero, or at least negligible, with respect to its rest level $Ar$.

Under the sole action of signal $U_4$, multivibrator 101 would thus be triggered into state "1," if it were not already in this state, at time $T_1$ and would return to state "0" at time $T_3$.

As will be seen hereinafter, between instants $T_0$ and $T_2$ signal $U_4$ is either the only signal applied to circuit 102, or the other signal applied thereto is too low to counterbalance the action of signal $U_4$, it is thus certain that multivibrator 101 will be in state "1" between times $T_1$ and $T_2$.

Referring again to FIG. 13, circuit 102 comprises a second input 151, which is connected to the output of an integrating circuit 105 from which it receives a signal $U_5$. The input of the integrating circuit 105 is the already mentioned input 46 connected to the checked channel.

FIG. 14*b* shows the signal $U_5$ obtained through integrating the test signal with a suitable time constant. This signal is that shown in full line, or in dotted line, according to whether the phase of the receiver switch is correct or wrong. The short slightly decreasing portions of signal $U_5$, corresponding to the short zero levels separating two trapezia of the test signal shown in FIG. 2, have not been shown in FIG. 14*b*. Disregarding these portions, $U_5$ is a signal whose level increases between instant $T_2$ i.e. the beginning of the checking period, and the instant $T_5$ i.e. the end of the same period. It then decreases to become practically zero at instant $T_6$, i.e. at the end of the vertical blanking time interval (increasing or decreasing in absolute value has been considered here).

The circuit is adjusted so that signal $U_5$, when it is negative, reaches between instants $T_3$ and $T_4$ a level sufficient in absolute value for making it impossible for the algebraical sum $U_s$ of signals $U_4$ and $U_5$ to reach level $A_{40}$.

Signal $U_5$ is practically zero when an achrome television programme is being received.

Considering the sum $U_s$ of signals $U_4$ and $U_5$, the following situation is obtained at the end of a vertical blanking time interval:

(a) Achrome television programme: Signal $U_5$ is zero. Multivibrator 101, after having been triggered into state "1" has been reset to state "0." The colour channels are blocked, as they have to be, and the phase of the receiver switch does not matter.

(b) Colour programme with signal $U_5$ indicating a correct phase of the receiver switch: As will be seen, multivibrator 101, except at the time when the receiver is put into operation, at which time its state is entirely random, is in state "1" at the beginning of the vertical blanking interval. In any case, it is triggered into this state at instant $T_1$, if it is not already in this state, and, since signal $U_s$, the sum of $U_4$ and $U_5$, cannot reach level $A_{40}$, $U_5$ being negative, it remains in this state. The colour channels are thus in the unblocked state, and the phase of the receiver switch remains unaltered, i.e. correct.

(c) Colour programme with signal $U_5$ indicating a wrong phase of the receiver switch: multivibrator 101 is again in state "1" after time $T_1$, but signal $U_5$ being now positive, its action does not counterbalance, but on the contrary reinforces that of signal $U_4$ in triggering multivibrator 101 back into state "0" at an instant comprised between instants $T_2$ and $T_3$. At the same time, circuit 107 supplies a pulse which is added, in adder 108, to the retrace pulses at the line frequency which are applied to the input 44 thereof. The phase of multivibrator 65, and consequently that of the receiver switch 367, are reversed so that they are again correct. When the next vertical blanking time interval begins, the state of things has been returned to that of case (b), which means that the colour channels are unblocked, and the switch phase will be correct.

It will be noted that in case (c), the operation of the circuit brings about an unnecessary colour killing for the duration of one picture field, but, as this occurs only, for a very short duration, i.e. for $\frac{1}{50}$ of a second if the field frequency is 50 fields per second, this is hardly a nuisance. It will also be noted that in the arrangements of FIG. 13 the maintaining of the alternation, at the line frequency, of the states of the switch during the checking periods is conditioned by the presence of a test signal indicative of a correct phase of the switch, while in the preceding embodiments it was conditioned by the absence of a test signal indicating that the switch phase was wrong this difference appearing only if no test signal is present.

It may be desired to put the colour killer in action when the subcarrier might prove to have too low an amplitude for providing a satisfactory colour picture. It then suffices for example to pick up the frequency modulated subcarrier, preferably between the output of the limiter of the frequency demodulator 38 or 39 of FIG. 4, and to rectify the frequency modulated subcarrier appearing at this point by means of an amplitude detector, which is connected so as to supply a negative signal $U_6$, whose level increases, in absolute value, with the amplitude of the undemodulated subcarrier. The circuit is, of course, adjusted so that the maintaining of multivibrator 101 is state "1" should only be possible if there is obtained simultaneously a signal $U_5$ which is negative, and a signal $U_6$, the absolute value of the level of which is sufficiently high. A circuit 106, whose input 146 is connected to the aforementioned limiter, and which derives signal $U_6$ from the frequency modulated subcarrier, as well as the connection thereof to the adding circuit 102, are shown in dotted lines in FIG. 13.

Figure 15:
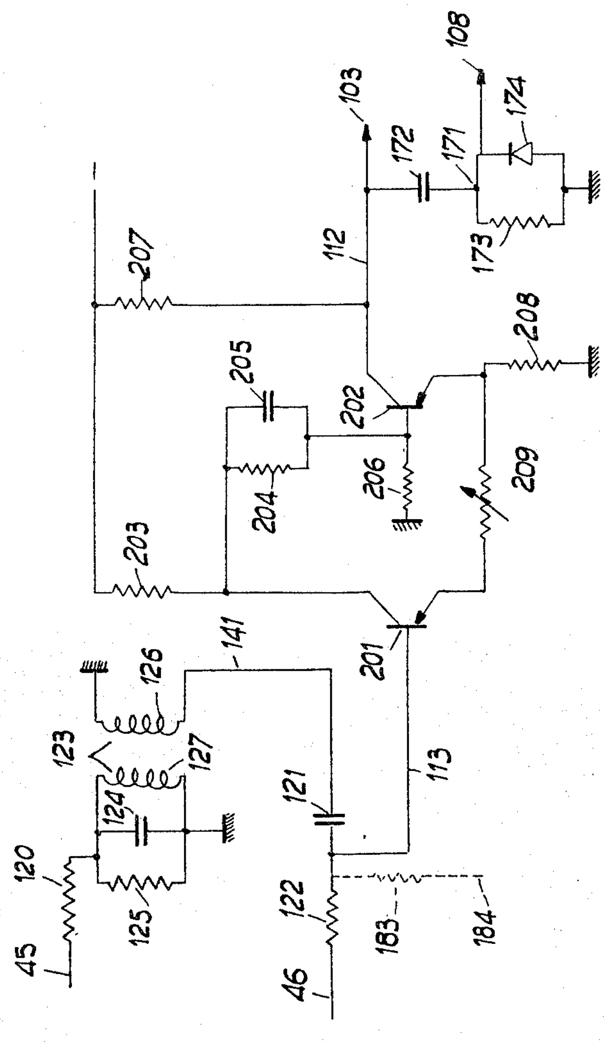
FIG. 15 shows an embodiment of a portion of the circuit of FIG. 13.

FIG. 15 is a detailed circuit of part of the circuit of FIG. 13. The portion thereof shown in dotted line will be first disregarded.

Figure 16:
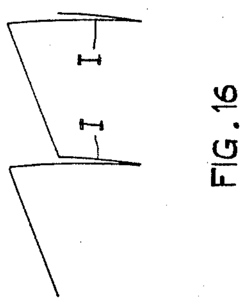

In FIG. 15, circuit 104, which supplies signal $U_4$, receives, on its input 45, a signal essentially built up by a fraction of the negative pulse I appearing at the terminals of the vertical deflection coils of the receiver during each vertical retrace period as shown in FIG. 16.

Input 45 feeds, through a resistor 120, a circuit whose other terminal is grounded and which comprises in parallel a coil 127, a capacitor 124 and a damping resistor 125.

Coil 127 builds up the primary winding of a transformer 123, whose secondary winding 126 has one terminal grounded, its other terminal building up the output 141 of circuit 104, and being, as will be seen later, connected so that the load of the secondary should be negligible.

The reactive elements of the parallel circuit are so selected that, when it is at a critical damping, the current flowing in coil 127, once the circuit in parallel has been shock excited, becomes maximum after a time interval corresponding to interval $T_0-T_2$ of FIG. 14*a*. Resistor 125 is selected to bring about this critical damping.

Figure 17:
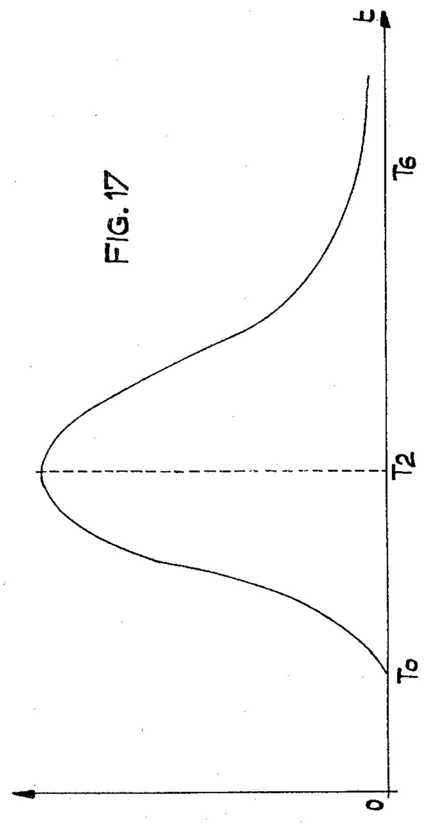
FIGS. 16 and 17 are graphs illustrating the operation of the circuit of FIG. 15.

Under these conditions, when the circuit in parallel is shock excited at instant $T_0$ by the pulse applied to input 45, the current in the coil 127 of FIG. 15 varies as indicated in FIG. 17.

The load of the secondary winding 126 being negligible, the current which flows therein is, for all practical purposes, equal to the derivative of the current circulating in the primary winding, with the opposite sign, and has consequently the form desired for signal $U_4$ as shown in FIG. 14*a*.

Integrating circuit 105 has to derive from the test signal the signal $U_5$ between instants $T_2$ and $T_5$. But there is no objection against the integrated signal continuing beyond the checked period until instant $T_0$ of the next blanking interval, provided it should not approach the limits of the interval $A_{40}-A_{41}$.

In other words, circuit 105 may also, without inconvenience, integrate the picture signal $V-Y$ appearing at input 46 outside of the vertical blanking intervals, provided levels $A_{40}$ and $A_{41}$, and the maximum and minimum levels of signal $U_4$ are suitably adjusted, which can be readily achieved. This allows to dispense with a gating circuit between input 46 of circuit 105 and the integrating circuit.

Circuit 105 comprises resistor 122 in series with a capacitor 121, whose second terminal is connected to the output 141 of circuit 104.

Signal $U_5$ which would be collected at terminal 113, which is common to capacitor 121 and to resistor 122, if the second terminal of the capacitor were grounded, is thus in fact collected at this terminal together with signal $U_4$ to which it has been added, because of the connection of capacitor 121 to output 141. Capacitor 121 thus simultaneous provides the capacity of the integrating circuit 105 and the coupling between this latter circuit and circuit 104.

Terminal 113 is thus the output of the adding circuit 102 of FIG. 13.

Multivibrator 101 is, in this example, a Schmitt circuit comprising two p-n-p transistors, 201 and 202, whose emitters are connected by a variable resistor 209, the multivibrator being otherwise quite conventional. The point common to the emitter of transistor 202 and to resistor 209 is grounded through a resistor 208. The base of transistor 201, which is the input of the multivibrator, is connected to the output 113 of circuit 102. The base of transistor 202 is grounded through a resistor 206, and is also connected to the collector of transistor 201 through a circuit comprising a resistor 204 and a capacitor 205 in parallel.

The collectors of the two transistors 201 and 202 are connected to a negative voltage source, respectively through load resistors 203 and 207.

The output signal of the multivibrator is collected across resistor 207.

Transistor 201 is unblocked (state "1" of the multivibrator), if it was not so already, by an input voltage equal to or less than voltage $A_{41}$ of FIG. 14*a* and blocked (state "0" of the multivibrator), if it was not already so, by a voltage equal to or higher than voltage $A_{40}$.

In state "1" of the multivibrator, there is thus obtained at output 112, connected to the collector of transistor 202, a voltage $A_1$ and in state "0" of the multivibrator, a voltage $A_0$ algebraically greater than $A_1$. This voltage $A_0$ or $A_1$ is applied to the colour channels 103 of the receiver.

Output 112 is also connected to the input of a circuit 107, comprising a capacitor 172 in series with a circuit comprising in parallel a resistor 173 and a diode 174 and which is grounded between the resistor and the diode. Diode 174 is connected so that the anode thereof is grounded.

Capacitor 172 and resistor 173 build up a differentiating circuit.

Consequently, when the output signal of the multivibrator changes from level $A_1$ to the higher level $A_0$, this results in the appearance at terminal 171, common to capacitor 172 and to resistor 173, of a positive pulse which is applied to the adding circuit 108. When, on the contrary, the output signal of the multivibrator changes from $A_0$ to $A_1$, a negative pulse would be in the same way obtained at terminal 171, were it not for diode 174 which leads to ground the corresponding current.

The circuit is so adjusted that the positive pulse thus applied to the adding circuit 108 may not coincide in time with one of the regular pulses of the pulse sequence at the line frequency which are applied to input 44. This is readily achieved since the pulses at the line fresuency, as well as the tripping of multivibrator 101 from state "1" to state "0" occur at well defined instants of the vertical blanking intervals.

If it is now desired to add to above functions performed by the circuit of FIG. 15, the blocking of the colour channels when the subcarrier does not have a sufficient amplitude, it will suffice to apply the signal obtained through amplitude detection of the frequency modulated subcarrier to an input 184, which is connected through a resistor 183 to the terminal common to resistor 122 and capacitor 121 of the combined circuit 102–105, the parameters of the circuit being moreover calculated accordingly.

Elements 183 and 184 are shown in dotted line in FIG. 15.

Of course the invention is not limited to the embodiments described.

For example, coefficients $k_1$ and $k_2$ of the colour signals $A_1$ and $A_2$ may be both taken positive. The polarity inverter 27 in the transmitter of FIG. 3 may be then substituted by a polarity inverter inserted between generator 16 and adder 25. In this case, none of the frequency demodulators 38 and 39, in the receiver of FIG. 4, would inverse the polarity of the modulating signal; outputs $S_1$ and $S_2$ of the matrix would supply, during the checking periods signals having opposite signs, and either of them could be used as a checked channel. The same holds true for output $S_3$, although it would not then present the additional advantage which it has when $k_1$ and $k_2$ have opposite signs.

One of the output channels of the commutator 367 of FIG. 4 might also be selected to serve as a checked channel in any case. However, the use to this effect of an output channel of matrix 40 has the advantage of not perturbing the load of the frequency demodulators when, as in the described example, the colour signals are demodulated after switching.

Although it is generally preferred to use a checking period covering the duration of several picture lines, this is by no means an imperative condition.

On the other hand, the described switch control circuits, with the exception of those of FIGS. 13 and 15, may operate with checking periods having a frequency lower than the field frequency, provided the regular alternation of the two transmitted signals is not interrupted at the transmitting end between the beginning of a checking period and the beginning of the vertical blanking interval including the next checking period.

In the transmitter shown in FIG. 3, it is possible to inject indirectly one or two identifying signals through applying signals to one or more inputs of matrix 1.

It has been proposed, in a particular embodiment of the receiver for the sequential-simultaneous system with memory, to connect the output of the direct and of the delayed channels to the two inputs of an adding circuit and to the two inputs of a subtracting circuit. The adding circuit thus delivers signal $A_1+A_2$, while the subtracting circuit alternately delivers signals $A_1-A_2$ and $A_2-A_1$. The subtracting circuit then feeds the two inputs of a simple switch, respectively directly and through a polarity inverter. In this case, also, the receiver switch must be in phase with the transmitter switch so as to always deliver signal $A_1-A_2$ at its output, signal $A_2-A_1$ remaining unused, and needing no output channel of the switch.

It will be readily seen that, assuming two identification signals $a_1=-a_2=a$ are used, the output of the receiver switch will deliver, during the checking periods, either signal $2a$ or signal $-2a$ according to its phase relatively to that of the transmitter switch. Thus this output or any other channel in which a signal is propagated which is a function of that appearing at the switch output, may be used as a checked channel for controlling the receiver switch.

The invention has been described in the particular case, where the sequential signals are repeated in the receiver before they are applied to the receiver switch.

In the opposite case, i.e. if the sequential signals are not repeated or are switched before they are repeated, the receiver switch will be a simple switch with one input and two outputs, the output channels of which will not be fed simultaneously. The invention still applies, provided a suitable switch control circuit is used, for example that of FIG. 5, the charging and discharging time constants of integrator 63 being suitably selected, or the arrangements of FIGS. 10 to 12.

The system according to the invention may also be operated with only one identification signal although it is always better to have two such signals with opposed polarities, which provides a better protection against noise.

In this case, arrangements of the type shown in FIGS. 5, 7, 10, 11 and 12 may be used, while selecting a check channel which provides a signal which is not zero, during the check periods, if the receiver switch has the wrong phase. Arrangements of the type of those of FIGS. 13 to 15 may be used, provided the check channel furnishes during the check periods a signal which is not zero if the phase of the switch is correct.

It is to be noted that it is not essential to eliminate the subcarrier outside of the check periods, during the vertical blanking intervals.

What is claimed is:

1. A colour television system comprising: a transmitter and at least one receiver;

said transmitter comprising: means for generating a first and a second colour signal; a switching system having a first and a second input channel and an output channel, said output channel having an output; said switching system having a first state in which it connects said output channel to said first input channel and a second state in which it connects said output channel to said second input channel; means for applying said first and second colour signals respectively to said first and second input channels; means for generating at least one signal, referred to as a channel identifying signal, during recurrent time intervals, referred to as checking periods, each of said checking periods occurring within a vertical blanking interval; means for injecting said identifying signal into one of said input channels; means for causing said switching system to pass over regularly, at the line frequency, from one state to the other at least between the beginning of each of said checking periods and the beginning of the vertical blanking interval containing the next checking period; and means, coupled to said output channel, for transmitting the output signal of said output channel;

said receiver comprising: receiving means for receiving said transmitted output signal and for deriving therefrom two sequential colour signals, which may be the same as said first and second colour signals; a switch having at least one input, coupled to said receiving means, for receiving said two sequential colour signals, and at least one output; said switch having a first state in which it connects said switch output to said switch input and a second state in which it disconnects said switch output from said switch input; said receiver switch and said transmitter switching system being said to be in phase when their respective first and second states coincide in time; a channel, referred to as a checked channel, coupled to said switch output, whereby, during said checking periods, a signal, referred to as a test signal, propagates therein, which depends upon whether said switching system and said switch are in phase or not; and a switch control circuit comprising means for causing said switch to pass over regularly from one state to the other, at the line frequency, outside of said checking periods, and for maintaining or altering the regular alternation, at the line frequency, of said states of said switch during said checking periods, in accordance with a characteristic of the test signal supplied to said switch control circuit by said checked channel.

2. A colour television transmitter comprising means for generating a wide-band signal and synchronizing signal; means for generating a first and a second colour signal; a switching system having a first and a second input channel and at least one output channel, said output channel having an output; said switching system having a first state in which it connects said output channel to said first input channel and a second state in which it connects said output channel to said second input channel; means for applying said first and second colour signals to said first and second input channels; means for generating at least one signal, referred to as a channel identifying signal, during recurrent time intervals, referred to as checking periods, each of said checking periods occurring within a vertical blanking interval; means for injecting said identifying signal into said first input channel; means for causing said switching system to pass over regularly, at the line frequency, for one of said states to the other at least between the beginning of each of said checking periods and the beginning of the vertical blanking interval containing the next checking period; means for modulating the output signal of said output channel on an auxiliary wave; means for mixing said modulated auxiliary wave with the said wide-band signal and with said synchronizing signals to form a complex signal; and means for transmitting said complex signal.

3. A colour television transmitter as claimed in claim 2, wherein said identifying signal presents a single polarity.

4. A colour television transmitter as claimed in claim 2, wherein said first and second colour signals are respectively proportional to the colour difference signals $R—Y$ and $B—Y$.

5. A colour television transmitter as claimed in claim 2, wherein said checking periods occur at the field frequency.

6. A colour television transmitter comprising means for generating a wide-band signal and synchronizing signals; means for generating a first and a second colour signal; a switching system having a first and second input channel and at least one output channel, said output channel having an output; said switching system having a first state in which it connects said output channel to said first input channel and a second state in which it connects said output channel to said second input channel; means for applying said first and second colour signals to said first and second input channels; means for generating two signals, referred to as first and second channel identifying signals, during recurrent time intervals, referred to as checking periods, each of said checking periods occurring during a vertical blanking interval; means for injecting said first and second channel identifying signals respectively into said first and second input channels; means for causing said switching system to pass over regularly, at the line frequency, from one of said states to the other at least between the beginning of each of said checking periods and the beginning of the vertical blanking interval containing the next checking period; means for modulating the output signal of said output channel on an auxiliary wave; means for mixing said modulated auxiliary wave with said wide-band signal and with said synchronizing signals to form a complex signal; and means for transmitting said complex signal.

7. A colour television transmitter as claimed in claim 6, wherein each of said identifying signals presents a single polarity, one of said identifying signals being derived from the other through a polarity reversal.

8. A colour television transmitter comprising means for generating a wide-band signal and synchronizing signals; means for generating a first and a second colour signal; a switching system having a first and a second input channel and at least one output channel, said output channel having an output; said switching system having a first state in which it connects said output channel to said first input channel and a second state in which it connects said output channel to said second input channel; means for applying said first and second colour signals to said first and second input channels; means for generating two signals, referred to as first and second channel identifying signals, during recurrent time intervals, referred to as checking periods, each of said checking periods occurring during a vertical blanking interval; each of said identifying signals, being a periodic signal at the line frequency within each of said checking periods, and said periodic signal comprising during each line period a waveform, with a level different from zero, whose duration is equal to that of a picture line interval, and a zero level portion whose duration is equal to that of a horizontal blanking interval; means for injecting said first and second channel identifying signals respectively into said first and second input channels; means for causing said switching system to pass over regularly, at the line frequency, from one of said states to the other at least between the beginning of each of said checking periods and the beginning of the vertical blanking interval containing the next checking period; means for modulating the output signal of said output channel on an auxiliary wave; means for mixing said modulated auxiliary wave with said wide-band signal and with said synchronizing signals to form a complex signal; and means for transmitting said complex signal.

9. A colour television transmitter, as claimed in claim 8, wherein said waveform comprises a flat portion of maximum level in absolute value.

10. A colour television transmitter comprising: means for generating a wide-band signal and synchronizing signals; means for generating a first and a second colour signal; a switching system having a first and a second input channel and at least one output channel, said output channel having an output; said switching system having a first state in which it connects said output channel to said first input channel and a second state in which it connects said output channel to said second input channel; means for applying said first and second colour signals to said first and second input channels; means for generating two signals, referred to as first and second channel identifying signals, during recurrent time intervals, referred to as checking periods, each of said checking periods occurring during a vertical blanking interval; each of said identifying signals being a periodic signal at the line frequency within each of said checking periods, said periodic signal comprising, during each line period a trapezoidal waveform whose duration is equal to that of a picture line and a zero level portion whose duration is equal to that of a horizontal blanking interval; means for injecting said first and second channel identifying signals respectively into said first and second input channels; means for causing said switching system to pass over regularly, at the line frequency; from one of said states to the other at least between the beginning of each of said checking periods and the beginning of the vertical blanking interval containing the next checking period; means for modulating the output signal of said output channel on an auxiliary wave; means for mixing said modulated auxiliary wave with said wide-band signal and with said synchronizing signals to form a complex signal; and means for transmitting said complex signal.

11. A colour television transmitter comprising: means for generating a first and a second colour signal; a switching system having a first and a second input channel and an output channel; said output channel having an output and including a pre-emphasis filter; said switching system having a first state in which it connects said output channel to said first input channel and a second state in which it connects said output channel to said second input channel; means for generating two signals, referred to as first and second channel identifying signals, during recurrent time intervals, referred to as checking periods, each of said checking periods occurring during a vertical blanking interval; means for injecting said first and second channel identifying signals respectively into said first and second input channels; means for causing said switching system to pass over regularly, at the line frequency, from one state to the other at least between the beginning of each of said checking periods and the beginning of the vertical blanking interval containing the next checking period; and means coupled to said output channel for transmitting the output signal of said output channel; each of said identifying signals being, within each checking period, a periodic signal at the line frequency presenting at said output of said output channel a flat portion whose level is equal to the maximum possible level of the same polarity of said colour signals at said output of said output channel.

12. A colour television transmitter comprising: means for generating a first and a second colour signal; a switching system having a first and a second input channel and an output channel, said output channel having an output; each of said input channels including a pre-emphasis filter; said switching system having a first state in which it connects said output channel to said first input channel and a second state in which it connects said output channel to said second input channel; means for generating two signals, referred to as first and second channel identifying signals, during recurrent time intervals, referred to as checking periods, each of said checking periods occurring during a vertical blanking interval; means for injecting said first and second channel identifying signals respectively into said first and second input channels; means for causing said switching system to pass over regularly, at the line frequency, from one state to the other at least between the beginning of each of said checking periods and the beginning of the vertical blanking interval containing the next checking period; and means coupled to said output channel for transmitting the output signal of said output channel; each of said identifying signals being, within each checking period, a periodic signal at the line frequency presenting at said output of said output channel a flat portion whose level is equal to the maximum possible level of the same polarity of said colour signals at said output of said output channel.

13. A colour television transmitter for transmitting over a common channel a luminance signal, synchronizing signals, and an auxiliary wave sequentially modulated by a first and a second colour signal alternating at the line frequency during the visible portion of each field, said transmitter comprising: means for generating primary colour signals; a matrix fed with said primary colour signals for delivering said first colour signal, reversed in polarity, said second colour signal and said luminance signal, respectively on a first, a second and a third output; means for generating a signal, referred to as a channel identifying signal, during time intervals occurring at the field frequency and referred to as checking periods, each of said checking periods occurring during a vertical blanking interval; said identifying signal being a periodic signal at the line frequency within each of said checking periods; said periodic signal comprising during each line period a waveform having a single polarity; said identifying signal generating means comprising a signal generator having an output and means for applying to said generator a signal at the field frequency and a signal at the line frequency; a first mixer having two inputs, respectively coupled to said matrix first output and to said generator output, and an output; a polarity inverter having an input coupled to said mixer output and an output; a second mixer having two inputs respectively coupled to said matrix second output and to said signal generator output, and an output; a switching system having a first and a second input respectively coupled to said polarity inverter output and to said second mixer output, and an output channel, said output channel having an output; said switching system having a first state in which it connects said output channel to its first input and a second state in which it connects said output channel to its second input; means for causing said switching system to pass over regularly, at the line frequency, from one state to the other at least between the beginning of each of said checking periods and the beginning of the next vertical blanking interval; means for modulating the output signal of said output channel on said auxiliary wave; means, having an output, for mixing said modulated wave with said luminance signal and said synchronizing signals; and means for transmitting the output signal of said mixing means.

14. A colour television transmitter for transmitting over a common channel a luminance signal, synchronizing signals, and an auxiliary wave sequentially modulated by a first and a second colour signal alternating at the line frequency during the visible portion of each field, said transmitter comprising: means for generating primary colour signals; a matrix fed with said primary color signals for delivering said first colour signal, said second colour signal and said luminance signal, respectively on a first, a second and a third output; means for generating a signal, referred to as a channel identifying signal, during time intervals occurring at the field frequency and referred to as checking periods, each of said checking periods occurring during a vertical blanking interval; said identifying signal being a periodic signal at the line frequency within each of said checking periods; said periodic signal comprising during each line period a waveform having a single polarity; said identifying signal generating means comprising a signal generator having an output and means for applying to said generator a signal at the field frequency and a signal at the line frequency; a first mixer having two inputs, respectively coupled to said matrix first output and to said generator output, and an output; a polarity inverter having an input coupled to said generator output and an output; a second mixer having two inputs respectively coupled to said matrix second output and to said polarity inverter output, and an output; a switching system having a first and a second input respectively coupled to said first and second mixer outputs, and an output channel, said output channel having an output; said switching system having a first state in which it connects said output channel to its first input and a second state in which it connects said output channel to its second input; means for causing said switching system to pass over regularly, at the line frequency, from one state to the other at least between the beginning of each of said checking periods and the beginning of the next vertical blanking interval; means for modulating the output signal of said output channel on said auxiliary wave; means, having an output, for mixing said modulated wave with said luminance signal and said synchronizing signals; and means for transmitting the output signal of said mixing means.

15. A colour television receiver adapted for operating with a composite signal elaborated in a transmitter, said composite signal comprising a wide-band picture signal, synchronizing signals and an auxiliary wave modulated in time division by two colour signals and by at least one other signal, referred to as a channel identifying signal; said colour signals and said identifying signal being, in said transmitter, directed to a common channel by means of a switching system having a first and a second input to which said colour signals are respectively applied during the visible portions of the fields and to one of which said identifying signal is applied during recurrent time intervals, referred to as checking periods, each of which occurs within a vertical blanking interval; said switching system having a first state in which it connects said output to sair first input and a second state in which it connects said output to said second input, and being actuated to pass over regularly, at the line frequency, from one state to the other, at least between the beginning of each of said checking periods and the beginning of the vertical blanking interval comprising the next checking period, said receiver comprising:

means for separating said synchronizing signals and said auxiliary wave from said composite signal; a synchronizing and sweep circuit; an auxiliary channel having an input and at least one output: means for applying said synchronizing signals and said auxiliary wave respectively to said synchronizing and sweep circuit and to said auxiliary channel input; a switch having at least one input coupled to said auxiliary channel output, and at least one output; said switch having a first state in which it connects said switch output to said switch input and a second state in which it disconnects said switch output from said switch input; said switch being said to have a correct phase or a wrong phase according to whether its first and second states respectively coincide in time with the first and second states of said transmitter switching system or not; a channel, referred to as a checked channel, having an input coupled to said switch output, whereby, during said checking periods, a signal, referred to as a test signal, propagates therein, which indicates whether the phase of said switch is correct or wrong; and a switch control circuit having a first input coupled to said synchronizing and sweep circuit for receiving therefrom pulses at the line frequency, and a second input coupled to said checked channel, at least during said checking periods, for causing said switch to pass over regularly, at the line frequency, from one state to the other, outside of said checking periods, and means, controlled by said test signal, for, during said checking periods, maintaining or altering the regular alternation, at the line frequency, of the states of said switch, in accordance with a characteristic of said test signal.

16. A colour television receiver, as claimed in claim 15, wherein said composite signal being transmitted by means of a carrier wave, and said auxiliary wave being a subcarrier wave, said receiver further comprises means for demodulating said carrier wave.

17. A colour television receiver as claimed in claim 15, wherein said checked channel input is directly connected to said switch output.

18. A colour television receiver as claimed in claim 15, wherein said auxiliary channel comprising means for repeating said colour signals, said repeating means including a direct channel and a delayed channel having a common input and respective outputs constituting a first and a second output of said auxiliary channel, said switch has a first and a second input, respectively coupled to said first and second auxiliary channel outputs, and a first and a second output, and, in its first state, connects its first output to its first input and its second output to its second input, whereas in its second state, it connects its second output to its first input and its first output to its second input.

19. A colour television receiver as claimed in claim 15, wherein said auxiliary channel comprising means for repeating said colour signals, said repeating means comprising a direct channel and a delayed channel having a common input and respective outputs, said auxiliary channel further comprises an adder and a subtractor, each having two inputs respectively coupled to said outputs of said direct and delayed channels and an output, a polarity inverter having an input coupled to said subtractor output and an output, said subtractor output and said polarity inverter output constituting a first and a second output of said auxiliary channel, and wherein said switch has a first and a second input respectively coupled to said first and second auxiliary channel outputs, and a first and a second output, and, in its first state, connects its first output to its first input and its second output to its second input whereas, in its second state, it connects its second output to its first input and its first output to its second input.

20. A colour television receiver as claimed in claim 15, wherein said checking periods occur at the field frequency.

21. A colour television receiver as claimed in claim 15, wherein said auxiliary channel having two outputs, and said switch having two inputs respectively coupled to said auxiliary channel outputs and two outputs, said receiver further comprising a matrix having two inputs respectively coupled to said switch outputs, and a plurality of output channels, said checked channel is one of said output channels of said matrix.

22. A colour television receiver adapted for operating with a composite signal elaborated in a transmitter, said composite signal comprising a wide-band picture signal, synchronizing signals and an auxiliary wave modulated in time divison by two colour signals and by at least one other signal, referred to as a channel identifying signal; said colour signal and said identifying signal being, in said transmitter, directed to a common channel by means of a switching system having a first and a second input to which said colour signals are respectively applied during the visible portions of the fields and to one of which said identifying signal is applied during recurrent time intervals, referred to as checking periods, each of which occurs within a vertical blanking interval; said switching system having a first state in which it connects said output to said first input and a second state in which it connects said output to said second input, and being actuated to pass over regularly, at the line frequency, from one state to the other, at least between the beginning of each of said checking periods and the beginning of the vertical blanking interval comprising the next checking period, said receiver comprising:

means for separating said synchronizing signals and said auxiliary wave from said composite signal; a synchronizing and sweep circuit; an auxiliary channel having an input and at least one output; means for applying said synchronizing signals and said auxiliary wave respectively to said synchronizing and sweep circuit and to said auxiliary channel input; a switch having at least one input coupled to said auxiliary channel output, and at least one output; said switch having a first state in which it connects said switch output to said switch input and a second state in which it disconnects said switch output from said switch input; said switch being said to have a correct phase or a wrong phase according to whether its first and second states respectively coincide in time with the first and second states of said transmitter switching system or not; a video-frequency channel, referred to as a checked channel, having an input coupled to said switch output, whereby, during said checking periods, a signal, referred to as a test signal, propagates therein, whose polarity indicates whether the phase of said switch is correct or wrong, said polarity being said to be correct or wrong according to whether it indicates that said phase is correct or wrong; and a switch control circuit comprising a two-state signal generator connected to said switch and passing from one state to the other for each control pulse applied thereto, and a circuit for delivering said control pulses;

said last mentioned circuit comprising: an integrating circuit having an input coupled to said checked channel at least during said checking periods and an output, said circuit integrating at least those of its input signals having a predetermined polarity for supplying an integrated signal; and translating means, coupled to said synchronizing and sweep circuit, for receiving therefrom a series of pulses at the line frequency and translating them as control pulses to said switching signal generator, said translating means, including correcting means coupled to said integrating circuit output, said correcting means being responsive to said integrated signal during said checking periods for modifying said series of pulses by an odd number of pulses or leaving it unaltered.

23. A colour television receiver as claimed in claim 22, wherein said control pulse delivering circuit further comprises an input coupled to said synchronizing and sweep circuit for receiving therefrom pulses at the field frequency, and means for deriving from each of said last-mentioned pulses an auxiliary signal which is used for making said correcting means inoperative when picture signals propagate in said checked channel.

24. A colour television receiver as claimed in claim 23, wherein said means for deriving said auxiliary signals are a parallel resonant circuit which is shock-excited by said pulses at the field frequency.

25. A colour television receiver as claimed in claim 23, wherein said integrating circuit integrates at least signals of said wrong polarity, and wherein said translating means comprise an electron device having at least one input electrode and an output electrode, said electron device being coupled to said outputs of said integrating circuit and of said auxiliary signal deriving means so as to be unblocked only in the presence of said auxiliary signal and of an integrated signal reaching a predetermined level of said wrong polarity, said output electrode being coupled to said input electrode, so that said electron device acts as a blocking oscillator once it has been unblocked, and to said means for translating said pulses at the line frequency.

26. A colour television receiver adapted for operating with a composite signal elaborated in a transmitter, said composite signal comprising a wide-band picture signal, syncvhronizing signals and an auxiliary wave modulated in time division by two colour signals and by at least one other signal, referred to as a channel identifying signal; said colour signal and said identifying signal being, in said transmitter, directed to a common channel by means of a switching system having a first and a second input to which said colour signals are respectively applied during the visible portions of the fields and to one of which said identifying signal is applied during recurrent time intervals, referred to as checking periods, each of which occurs within a vertical blanking interval; said switching system having a first state in which it connects said output to said first input and a second state in which it connects said output to said second input, and being actuated to pass over regularly, at the line frequency, from one state to the other, at least between the beginning of each of said checking periods and the beginning of the vertical blanking interval comprising the next checking period, said receiver comprising:

means for separating said synchronizing signals and said auxiliary wave from said composite signal; a synchronizing and sweep circuit; an auxiliary channel having an input and at least one output: means for applying said synchronizing signals and said auxiliary wave respectively to said synchronizing and sweep circuit and to said auxiliary channel input; a switch having at least one input coupled to said auxiliary channel output, and at least one output; said switch having a first state in which it connects said switch output to said switch input and a second state in which it disconnects said switch output from said switch input; said switch being said to have a correct phase or a wrong phase according to whether its first and second states respectively coincide in time with the first and second states of said transmitter switching system or not; a video-frequency channel referred to as a checked channel, having an input coupled to said switch output, whereby, during said checking periods, a signal, referred to as a test signal, propagates therein, whose polarity indicates whether the phase of said switch is correct or wrong, said polarity being said to be correct or wrong according to whether it indicates that said phase is correct or wrong; and a switch control circuit comprising a two-state signal generator connected to said switch and passing from one state to the other for each control pulse applied thereto, and a circuit for delivering said control pulses;

said last mentioned circuit comprising: a gate having a signal input coupled to said checked channel, a control input and an output; means, having an input coupled to said synchronizing and sweep circuit, for receiving therefrom signals at the field frequency and for deriving from said signals at the field frequency gating signals at the field frequency; means for applying said gating signals to said gate control input; an integrating circuit having an input coupled to said gate output, said circuit integrating at least those of its input signals having said wrong polarity for supplying an integrated signal; and translating means, coupled to said synchronizing and sweep circuit, for rceeiving therefrom a series of pulses at the line frequency and translating them as control pulses to said switching signal generator, said translating means including correcting means coupled to said integrating circuit output, said correcting means being responsive to said integrated signal for modifying said series of pulses by an odd number of pulses when said integrated signal reaches a sufficient level of said wrong polarity.

27. A colour television receiver as claimed in claim 26, wherein said pulses at the line frequency having said correct polarity, said translating means are an adding circuit having a first input coupled to said sweep and synchronizing circuit, a second input coupled to said integrating circuit output, and an output coupled to said switching signal generator.

28. A colour television receiver adapted for operating with a composite signal elaborated in a transmitter, said composite signal comprising a wide-band picture signal, synchronizing signals and an auxiliary wave modulated in time division by two colour signals and by at least one other signal, referred to as channel identifying signal; said colour signals and said identifying signal being, in said transmitter, directed to a common channel by means of a switching system having a first and a second input to which said colour signals are respectively applied during the visible portions of the fields and to one of which said identifying signal is applied during recurrent time intervals, referred to as checking periods, each of which occurs within a vertical blanking interval; said switching system having a first state in which it connects said output to said first input and a second state in which it connects said output to said second input, and being actuated to pass over regularly, at the line frequency, from one state to the other, at least between the beginning of each of said checking periods and the beginning of the vertical blanking interval comprising the next checking period, said receiver comprising:

means for separating said synchronizing signals and said auxiliary wave from said composite signal; a synchronizing and sweep circuit; an auxiliary channel having an input and at least one output; means for applying said synchronizing signals and said auxiliary wave respectively to said synchronizing and sweep circuit and to said auxiliary channel input; a switch having at least one input coupled to said auxiliary channel output, and at least one output; said switch having a first state in which it connects said switch output to said switch input and a second state in which it disconnects said switch output from said switch input; said switch being said to have a correct phase or a wrong phase according to whether its first and second states respectively coincide in time with the first and second states of said transmitter switching system or not; a video-frequency channel, referred to as a checked channel, having an input coupled to said switch output, whereby, during said checking periods, a signal, referred to as a test signal, propagates therein, whose polarity indicates whether the phase of said switch is correct or wrong, said polarity being said to be correct or wrong according to whether it indicates that said phase is correct or wrong; the maximum level of said wrong polarity of said test signal being substantially superior in absolute value to the maximum level of said wrong polarity of the picture signals propagating in said checked channel; and a switch control circuit comprising a two-state signal generator coupled to said switch and passing from one state to the other for each control pulse applied thereto, and a circuit for delivering said control pulses, said last mentioned circuit comprising:

an integrating circuit having an input permanently coupled to said checked channel and an output, said integrating circuit integrating at least those of its input signals having said wrong polarity for supplying an integrated signal; and translating means, coupled to said synchronizing and sweep circuit, for receiving therefrom a series of pulses at the line frequency and translating them as control pulses to said switching signal generator, said translating means including correcting means, coupled to said integrating circuit output, for modifying said series of pulses by an odd number of pulses when said integrated signal reaches a sufficient level of said wrong polarity.

29. A colour television receiver adapted for operating with a composite signal elaborated in a transmitter, said composite signal comprising a wide-band picture signal, synchronizing signals and an auxiliary wave modulated in time division by two colour signals and by at least one other signal, referred to as a channel identifying signal; said colour signals and said identifying signal being, in said transmitter, directed to a common channel by means of a switching system having a first and a second input to which said colour signals are respectively applied during the visible portions of the fields and to one of which said identifying signal is applied during recurrent time intervals, referred to as checking periods, each of which occurs within a vertical blanking interval; said switching system having a first state in which it connects said output to said first input and a second state in which it connects said output to said second input, and being actuated to pass over regularly, at the line frequency, from one state to the other, at least between the beginning of each of said checking periods and the beginning of the vertical blanking interval comprising the next checking period, said receiver comprising:

means for separating said synchronizing signals and said auxiliary wave from said composite signal; a synchronizing and sweep circuit; an auxiliary channel having an input and at least one output; means for applying said synchronizing signals and said auxiliary wave respectively to said synchronizing and sweep circuit and to said auxiliary channel input; a switch having at least one input coupled to said auxiliary channel output, and at least one output; said switch having a first state in which it connects said switch output to said switch input and a second state in which it disconnects said switch output from said switch input; said switch being said to have a correct phase or a wrong phase according to whether its first and second states respectively coincide in time with the first and second states of said transmitter switching system or not; a video-frequency channel, referred to as a checked channel, having an input coupled to said switch output, whereby, during said checking periods, a signal, referred to as a test signal, propagates therein, whose polarity indicates whether the phase of said switch is correct or wrong, said polarity being said to be correct or wrong according to whether it indicates that said phase is correct or wrong; the maximum level of said wrong polarity of said test signal being substantially superior in absolute value to the maximum level of said wrong polarity of the picture signals propagating in said checked channel; and a switch control circuit comprising a two-state signal generator connected to said switch and passing from one state to the other for each control pulse applied thereto, and a circuit for delivering said control pulses, said last mentioned circuit comprising:

an integrating circuit having an input permanently coupled to said checked channel and an output, said integrating circuit integrating at least those of its input signals having said wrong polarity for supplying an integrated signal; a gate having a signal input coupled to said synchronizing and sweep circuit for receiving therefrom pulses at the line frequency, a control input coupled to said integrating circuit output, and an output coupled to said switching signal generator.

30. A colour television receiver adapted for operating with a composite signal elaborated in a transmitter, said composite signal comprising a wide-band picture signal, synchronizing signals and an auxiliary wave modulated in time division by two colour signals and by a least one other signal, referred to as a channel identifying signal; said colour signals and said identifying signal being, in said transmitter, directed to a common channel by means of a switching system having a first and a second input to which said colour signals are respectively applied during the visible portions of the fields and to one of which said identifying signal is applied at the field frequency during recurrent time intervals, referred to as checking periods, each of which occurs within a vertical blanking interval; said switching system having a first state in which it connects said output to said first input and a second state in which it connects said output to said second input, and being actuated to pass over regularly, at the line frequency, from one state to the other, at least between the beginning of each of said checking periods and the beginning of the vertical blanking interval comprising the next checking period, said receiver comprising:

means for separating said synchronizing signals and said auxiliary wave from said composite signal; a synchronizing and sweep circuit; an auxiliary channel having an input and at least one output; means for applying said synchronizing signals and said auxiliary wave respectively to said synchronizing and sweep circuit and to said auxiliary channel output; a switch having at least one input coupled to said auxiliary channel output and a first and a second output channels; said switch having a first state in which it connects said first output channel to said switch input, and a second state in which it connects said second output channel to said switch input; said switch being said to have a correct phase or a wrong phase according to whether its first and second states respectively coincide in time with the first and second states of said transmitter switching system or not; a video-frequency channel, referred to as a checked channel, having an input coupled to said switch output, whereby, during said checking periods, a signal, referred to as a test signal, propagates therein, whose polarity indicates whether the phase of said switch is correct or wrong, said polarity being said to be correct or wrong according to whether it indicates that said phase is correct or wrong; and a combined switch control and colour-killer circuit comprising:

a two-state switching signal generator connected to said switch and passing from one state to the other for each control pulse applied thereto; an integrating circuit having an input coupled to said checked channel and an output, said integrating circuit integrating at least those of its input signals having said correct polarity for supplying an integrated signal; a bistable multivibrator having a first and a second state, said multivibrator having a control input and an output, said multivibrator output being coupled for blocking the transmission in said output channels of said switch when said multivibrator is in its second state and for unblocking said transmission when said multivibrator is in its first state; a pluse generating circuit having an input coupled to said multivibrator output for generating a pulse only when said multivibrator passes from its first state into its second state, and an output; a first adding circuit having a first input coupled to said pulse generating circuit output and a second input coupled to said synchronizing and sweep circuit for receiving therefrom pulses at the line frequency, and an output coupled to said switching signal generator; means, having an input coupled to said synchronizing and sweep circuit, for receiving therefrom pulses at the field frequency and for deriving from said last mentioned pulses auxiliary signal at the field frequency; said auxiliary signal deriving means having an output; and a second adding circuit having two inputs respectively coupled to said outputs of said auxiliary signal deriving means and of said integrating circuit, and an output coupled to said control input of said multivibrator; the constants of the combined circuit and the variation of said auxiliary signal as a function of time being such that when only the latter signal is applied to said second adding circuit, said multivibrator is always in its first state at a predetermined instant of each vertical blanking interval preceding the checking period included therein, and returned to its second state within said checking period.

31. A colour television receiver circuit as claimed in claim 30, wherein said constants are selected such that said multivibrator is prevented from returning to its second state if said integrated signal reaches a predetermined level of said correct polarity.

32. A colour television receiver circuit as claimed in claim 30, wherein said second adding circuit comprising a third input, means are provided for rectifying said auxiliary wave to provide a rectified signal having said correct polarity and for applying said rectified signal to said third input, the constants of the combined circuit being selected such that said multivibrator is prevented from returning to its second state only if both said integrated signal and said rectified signal reach predetermined levels of said correct polarity.

References Cited by the Examiner

UNITED STATES PATENTS

| | | | |
|---|---|---|---|
| 2,378,746 | 6/1945 | Beers | 178—5.2 |
| 2,709,717 | 5/1955 | Werenfels | 178—5.2 X |
| 2,938,945 | 5/1960 | De France | 178—5.4 |
| 2,993,086 | 7/1961 | De France | 178—5.2 |
| 3,073,894 | 1/1963 | De France | 178—5.2 |
| 3,162,838 | 12/1964 | Saurvanet | 178—5.2 |

DAVID G. REDINBAUGH, *Primary Examiner.*

J. H. SCOTT, *Assistant Examiner.*